(12) United States Patent
Rosen et al.

(10) Patent No.: US 7,797,217 B2
(45) Date of Patent: *Sep. 14, 2010

(54) SYSTEM FOR MANAGING THE TOTAL RISK EXPOSURE FOR A PORTFOLIO OF LOANS

(75) Inventors: Jonathan D. Rosen, Atlanta, GA (US);
Robert E. DeWitt, Duluth, GA (US);
David E. Metzger, Atlanta, GA (US);
Paul A. Bush, Lawrenceville, GA (US)

(73) Assignee: Entaire Global Intellectual Property, Inc., Duluth, GA (US)

( * ) Notice: Subject to any disclaimer, the term of this patent is extended or adjusted under 35 U.S.C. 154(b) by 201 days.

This patent is subject to a terminal disclaimer.

(21) Appl. No.: 11/564,128

(22) Filed: Nov. 28, 2006

(65) Prior Publication Data

US 2008/0126267 A1    May 29, 2008

Related U.S. Application Data

(63) Continuation of application No. 10/571,969, filed on Mar. 15, 2006.

(51) Int. Cl.
*G06Q 40/00* (2006.01)
(52) U.S. Cl. .................................................. 705/36 R
(58) Field of Classification Search ....................... None
See application file for complete search history.

(56) References Cited

U.S. PATENT DOCUMENTS

| | | | | |
|---|---|---|---|---|
| 5,262,941 A * | 11/1993 | Saladin et al. | ............. | 705/38 |
| 5,784,696 A * | 7/1998 | Melnikoff | ............. | 705/36 R |
| 5,852,811 A * | 12/1998 | Atkins | ............. | 705/36 R |
| 5,893,079 A * | 4/1999 | Cwenar | ............. | 705/36 R |
| 6,021,397 A | 2/2000 | Jones et al. | | |
| 6,078,903 A * | 6/2000 | Kealhofer | ............. | 705/36 R |
| 6,112,191 A * | 8/2000 | Burke | ............. | 705/41 |
| 6,671,673 B1 * | 12/2003 | Baseman et al. | ............. | 705/7 |
| 7,089,202 B1 * | 8/2006 | McNamar et al. | ............. | 705/35 |
| 7,343,339 B2 * | 3/2008 | Harrison et al. | ............. | 705/37 |
| 7,376,604 B1 * | 5/2008 | Butcher | ............. | 705/35 |

(Continued)

OTHER PUBLICATIONS

Anonymous; India: HSBC in Talks with Insurance Firms; Economic Times; May 6, 2000 (online).*

(Continued)

*Primary Examiner*—Alexander Kalinowski
*Assistant Examiner*—Virpi H Kanervo
(74) *Attorney, Agent, or Firm*—Alston & Bird LLP

(57) ABSTRACT

A computer system for monitoring and enhancing the collateral security underlying a set of loans is provided, including a system for calculating the unsecured value of the set at any time and for initiating additional collateral enhancement instruments when the unsecured value exceeds a certain limit. The system may include a variety of modules in communication with a relational database for storing data about the loans and system elements. The computer system may also be configured to allocate, manage, and execute the waterfall or cascade of funds between and among the various participants in a financial plan. The invention also includes a structured finance plan and related methods for enhancing the collateral security of a loan obtained for a life insurance or annuity product, and a system and method for managing a portfolio of such loans in order to obtain favorable financing and to facilitate securitization.

33 Claims, 10 Drawing Sheets

U.S. PATENT DOCUMENTS

| | | | |
|---|---|---|---|
| 7,415,471 B1 * | 8/2008 | Coleman | 707/100 |
| 7,526,446 B2 * | 4/2009 | Aguais et al. | 705/38 |
| 7,634,420 B2 * | 12/2009 | Kendall et al. | 705/35 |
| 7,693,782 B1 * | 4/2010 | Stricker et al. | 705/38 |
| 7,711,574 B1 * | 5/2010 | Bradley et al. | 705/10 |
| 2001/0027437 A1 * | 10/2001 | Turbeville et al. | 705/38 |
| 2001/0042785 A1 | 11/2001 | Walker et al. | |
| 2002/0040307 A1 * | 4/2002 | Roscoe et al. | 705/4 |
| 2002/0091610 A1 * | 7/2002 | Smith | 705/36 |
| 2003/0050884 A1 * | 3/2003 | Barnett | 705/35 |
| 2003/0139990 A1 * | 7/2003 | Greco | 705/35 |
| 2004/0078244 A1 * | 4/2004 | Katcher | 705/4 |
| 2004/0117302 A1 | 6/2004 | Weichert et al. | |
| 2004/0158520 A1 * | 8/2004 | Noh | 705/38 |
| 2004/0225537 A1 * | 11/2004 | Darr | 705/4 |
| 2004/0225595 A1 * | 11/2004 | Nolan, III | 705/38 |
| 2005/0044019 A1 * | 2/2005 | Novick et al. | 705/35 |
| 2005/0080704 A1 * | 4/2005 | Erlach et al. | 705/36 |
| 2005/0125341 A1 * | 6/2005 | Miri et al. | 705/39 |
| 2005/0144045 A1 * | 6/2005 | Corsi | 705/4 |
| 2005/0216316 A1 * | 9/2005 | Brisbois et al. | 705/4 |
| 2005/0267928 A1 * | 12/2005 | Anderson et al. | 709/200 |
| 2006/0031151 A1 * | 2/2006 | Dorr | 705/37 |
| 2006/0041453 A1 * | 2/2006 | Clark et al. | 705/4 |
| 2006/0184442 A1 * | 8/2006 | Krasnerman et al. | 705/35 |
| 2006/0259419 A1 * | 11/2006 | Monsen et al. | 705/38 |
| 2006/0293986 A1 * | 12/2006 | Sreenivasan et al. | 705/35 |
| 2007/0299760 A1 * | 12/2007 | Lange et al. | 705/36 R |
| 2008/0140457 A1 * | 6/2008 | Freund | 705/4 |
| 2008/0195541 A1 * | 8/2008 | Battaglini et al. | 705/43 |

OTHER PUBLICATIONS

Flannery, Mark J.; Capital Regulation and Insured Banks' Choice of Individual Loan; Journal of Monetary Economics; vol. 24, No. 2, pp. 235-258; 1989.*

Rosen, Jan M.; A Review; Computer Programs; New York Times; vol. 135, No. 46, 897, p. S51(1); Sep. 14, 1986 (abstract).*

International Search Report from corresponding International Application No. PCT/US2005/28159 dated Aug. 8, 2005.

Barclays Capital, "Guide to Cash Flow Collateralized Debt Obligations," Manual, Mar. 2002, 60 pages, CDO and Structured Funds Group, London EC3P 3AH.

"Section Four Special-Purpose Bankruptcy-Remote Entities," This chapter appears in U.S. CMBS Legal and Structured Finance Criteria published by Standard & Poor's Ratings Services on May 1, 2003. Copyright © Standard & Poor's, a division of The McGraw-Hill Companies. All Rights Reserved.

"Special Purpose Entities (SPEs) and the Securitization Markets," Prepared by The Bond Market Association International Swaps & Derivatives Association Securities Industry Association, Feb. 1, 2002.

US Office Action dated Jun. 26, 2009 for U.S. Appl. No. 10/571,969, filed Mar. 15, 2006.

* cited by examiner

SYSTEM FOR MANAGING THE TOTAL RISK EXPOSURE FOR A PORTFOLIO OF LOANS

CROSS-REFERENCE TO RELATED APPLICATIONS

This patent application is a Continuation of U.S. application Ser. No. 10/571,969, filed Mar. 15, 2006, which is based on PCT Application Number PCT/US2005/028159, filed Aug. 8, 2005, which claims priority from U.S. Provisional Application No. 60/599,532, filed Aug. 6, 2004. The contents of all of the above-listed applications are hereby incorporated by reference.

BACKGROUND

1. Technical Field

The following disclosure relates generally to the active monitoring and managing of a portfolio of loan obligations, and, more particularly, to a computer system and related methods for evaluating, selecting, and executing one or more financial instruments to enhance the collateral security for a portfolio of loans in order to obtain financing and facilitate securitization.

2. Description of Related Art

Computer systems are helpful tools in the management of financial products such as loans and insurance. Over the years, as computing speed and capacity has increased, the computer database has grown in its capacity to store and process large amounts of data in one or more tables. Relational databases may include multiple tables, linked together, wherein each table can be configured to store a certain type of data. Relational database systems may provide a structure in which to work, but many modern financial plans, financing structures, and products require the design and construction of a system tailored to fit the needs of the particular plan.

In the field of life insurance and annuity products, a policy or product may be purchased and the premium paid in monthly installments. As an alternative, a loan may be obtained and used to pay the premium all at once, in one or more lump-sum payments. The borrower may sign a promissory note or other agreement to make payments on the loan. The value of the policy or product itself may provide a basic level of collateral security for the loan, but typically there is a gap between the value of the policy or annuity and the amount of premium paid, especially at the beginning of the life of the policy. The gap represents an amount at risk that is generally unsecured by any collateral.

The amount of the gap often has a direct effect on the pricing and other terms of a premium loan. A higher gap amount, for example, may require the borrower to pay a higher interest rate. In other words, less attractive borrowing rates are available for loans when there is a higher gap amount, because the amount of the gap affects the lender's exposure in the event of default with respect to the loan.

The amount of the gap typically changes over time, depending on a variety of ever-changing factors including but not limited to the amount of premium paid to-date, the actuarial risk of surrender, the accumulated value of the policy or product, the cash value of the policy, the commissions paid by the carrier or insurer, the crediting rate of the particular carrier, and other factors affected by the specific terms and conditions of the policy. One technical problem in the field is the lack of a system for analyzing the effect of all these factors, over time, in order to monitor the changing value of the unsecured gap.

Another technical problem in the field is presented by the complicated task of analyzing and monitoring the gap amount for multiple policies or products. The task of analyzing the gap amount grows much more complicated when multiple loans must be evaluated. The task grows further complicated when each loan in a group of multiple loans has different terms and provisions, various kinds of underlying collateral security, and a different risk profile. Thus, there is a need in the art for a system for continually monitoring and evaluating the default exposure associated with a set of loans, over time, as the loan status, amount at risk, product values, and risk of default are progressively changing.

Yet another technical problem when multiple loans are financed as a group is the technical challenge of applying and allocating periodic loan payments between and among the various operating and escrow accounts of the lender, loan originator, credit provider, loan servicer, and other agents and participating entities. Proper allocation of payments is required to satisfy the terms of the contractual agreements between and among the parties. In addition, when multiple loans are involved, the allocation of payments may affect the gap amount. In this aspect, the technical problem of allocating funds is related to the technical challenge of monitoring and analyzing the gap amount.

The need in today's financial markets for an accurate and up-to-the-minute risk assessment for loan obligations, especially premium loans for products having a varying gap amount, represents a technical challenge because of the number of variables that must be analyzed in order to produce an accurate, reliable, and creditworthy evaluation.

SUMMARY OF THE INVENTION

The following summary is not an extensive overview and is not intended to identify key or critical elements of the apparatuses, methods, systems, processes, and the like, or to delineate the scope of such elements. This Summary provides a conceptual introduction in a simplified form as a prelude to the more-detailed description that follows.

The above and other needs are met by the present invention which provides a computer system for managing the total risk exposure for a plurality of loans, each of the loans used to purchase an insurance or annuity product. The computer system may include a finance module configured to combine the plurality of loans into a portfolio; calculate an aggregate risk for the portfolio, based on the current gap value of each insurance product in the portfolio, the current gap value minimized by the execution of one or more gap enhancement instruments such that the aggregate risk is sufficient to obtain a credit facility for financing the plurality of loans; and provide the aggregate risk results for the purpose of obtaining and maintaining the credit facility for the portfolio, the credit facility having terms generally more favorable than would be available for an individual loan selected from the plurality of loans.

The finance module may be further configured to calculate an aggregate yield for the portfolio, based on the yield of each loan in the portfolio; and provide the aggregate yield results for the purpose of obtaining and maintaining the credit facility.

The finance module may be further configured to provide the aggregate risk results to a loan purchaser wherein the results are of sufficient quality to permit the loan purchaser to issue a variable funding note to finance the purchase of the portfolio of loans; and coordinate the purchase of the variable funding note by a VFN purchaser.

The aggregate risk results may be of sufficient quality to permit the loan purchaser to act as a bankruptcy-remote special-purpose entity and to receive the portfolio of loans in a true sale, thereby further enhancing the creditworthiness of the portfolio of loans.

The finance module may be further configured to provide the aggregate risk results to an investment bank wherein the results are of sufficient quality to permit the issuance of asset-backed security interests in the portfolio of loans, suitable for trading in the capital markets to multiple investors. The asset-backed security interests may include commercial paper or a ratable pool of asset-backed securities. The finance module may also be further configured to provide the aggregate yield results to the investment bank.

In another aspect, the present invention provides a computer system for managing the total risk exposure for a plurality of loans, each of the loans used to purchase an insurance or annuity product. The computer system may include a gap enhancement module configured to retrieve from the database a current amount at risk for each insurance product, the current amount at risk including the premium paid; retrieve from the database a current value of each insurance product, the current value calculated based at least in part on (a) the current net cash value of the product, (b) the current accumulated value of the product, and (c) the current collateral value of the one or more instruments providing collateral security for the loan; calculate a current gap value for each insurance product, the current gap value representing the difference between the current amount at risk and the current value; compare the current gap value to a limit; if the current gap value exceeds the limit, identify and select one or more gap enhancement instruments from among a plurality of gap enhancement instruments designed to reduce the current gap value; and update the current collateral value to include the value of the selected one or more gap enhancement instruments.

The gap enhancement module may be further configured to compare the one or more gap enhancement instruments; identify a selected gap enhancement instrument from among the one or more gap enhancement instruments; and initiate the execution of the selected gap enhancement instrument.

The computer system may also include a finance module configured to combine the plurality of loans into a portfolio; calculate an aggregate risk for the portfolio, based on the current gap value of each insurance product in the portfolio, the current gap value minimized by the execution of one or more gap enhancement instruments such that the aggregate risk is sufficient to obtain a credit facility for financing the plurality of loans; and provide the aggregate risk results for the purpose of obtaining and maintaining the credit facility for the portfolio, the credit facility having terms generally more favorable than would be available for an individual loan selected from the plurality of loans.

The finance module may be further configured to calculate an aggregate yield for the portfolio, based on the yield of each loan in the portfolio; and provide the aggregate yield results for the purpose of obtaining and maintaining the credit facility.

The finance module may be further configured to provide the aggregate risk results to a loan purchaser wherein the results are of sufficient quality to permit the loan purchaser to issue a variable funding note to finance the purchase of the portfolio of loans; and coordinate the purchase of the variable funding note by a VFN purchaser.

The aggregate risk results may be of sufficient quality to permit the loan purchaser to act as a bankruptcy-remote special-purpose entity and to receive the portfolio of loans in a true sale, thereby further enhancing the creditworthiness of the portfolio of loans.

The finance module may be further configured to provide the aggregate risk results to an investment bank wherein the results are of sufficient quality to permit the issuance of asset-backed security interests in the portfolio of loans, suitable for trading in the capital markets to multiple investors. The asset-backed security interests may include commercial paper or a ratable pool of asset-backed securities. The finance module may also be further configured to provide the aggregate yield results to the investment bank.

In the computer system, the plurality of gap enhancement instruments may include a promissory note for each loan executed by a borrower in favor of a loan originator, and a collateral assignment of the insurance product executed by the insured in favor of the loan originator. The gap enhancement instruments may also include asset of the borrower pledged to the loan originator as collateral for the loan. The gap enhancement instruments may also include a UCC-1 statement filed to memorialize the pledge of the asset as collateral. The gap enhancement instruments may also include a compensation agreement between the insured and the borrower where the borrower is an employer of the insured. The gap enhancement instruments may also include an agreement to postpone payment of a portion of the commission earned when the product is sold. The gap enhancement instruments may also include a rider on the product waiving a portion of a surrender fee, in favor of the loan originator, the surrender fee representing an amount charged in the event the product is surrendered or the borrower defaults on the loan.

The gap enhancement instruments may also include an agreement to deposit funds in a reserve account, the funds representing a portion of a surrender fee, the surrender fee representing an amount charged in the event the product is surrendered or the borrower defaults on the loan. The funds may also represent a marketing allowance owed by a carrier to the loan originator, the marketing allowance including a portion of the costs associated with marketing the policy or product.

The gap enhancement instruments may also include an agreement by the an insurer, in the event of a surrender or default event, to extend a loan to the loan originator in an amount nearly equal to the current gap value, wherein the loan originator's repayment obligation to the insurer is ultimately secured by the pledged asset. The gap enhancement instruments may also include an agreement by a carrier to pay a marketing allowance to the loan originator, the marketing allowance including a portion of the costs associated with marketing the policy or product.

In another aspect, the present invention provides a computer system for managing the total risk exposure for a portfolio of loans, each used to purchase an insurance or annuity product. The computer system may be configured to calculate a current surrender rate based on the surrender data for the products in the portfolio, the surrender data comprising the surrender date, product type, product age, carrier identifier, cash value, and surrender charge; compare the current surrender rate to a desired surrender rate, the desired surrender rate established based on current market conditions and adjusted periodically; if the current surrender rate is greater than the desired surrender rate, calculate a pre-payment penalty designed to discourage surrender; if the current surrender rate is less than the desired surrender rate, calculate a surrender bonus designed to encourage surrender; and apply the prepayment penalty or the surrender bonus to a new loan under consideration for entry into the portfolio.

The computer system may also be configured to direct the loan originator to impose the pre-payment penalty or the surrender bonus as a provision of the loan, separate from any the surrender charge imposed by the insurer.

The computer system may also be configured to compare a forecast surrender rate to the current surrender rate, the forecast surrender rate based upon an actuarial evaluation performed by or on behalf of the product carrier; request adjustment of the actuarial evaluation based on the current surrender rate; and request an adjustment of the policy-related charges for one or more products based upon the adjustment of the actuarial evaluation. The system may also be configured to request compensation for the calculation of the current surrender rate, the compensation taking the form of an additional commission, an additional loan fee, an additional crediting rate to the policy in the form of a persistency bonus, an additional marketing allowance, or more favorable underwriting treatment. The computer system may also be configured to adjust the terms and provisions of the loan, based upon the adjustment of the actuarial evaluation.

In another aspect, the present invention provides a computer system for managing the total risk exposure for a portfolio of loans, each used to purchase an insurance or annuity product. The computer system may be configured to record surrender data when a surrender event occurs for any one of the products, the surrender data comprising the surrender date, product type, product age, carrier identifier, cash value, and surrender charge; calculate a current surrender rate based on the surrender data for the products in the portfolio; compare the current surrender rate to a desired surrender rate, the desired surrender rate established based on current market conditions and adjusted periodically; if the current surrender rate is greater than the desired surrender rate, calculate a pre-payment penalty designed to discourage surrender; if the current surrender rate is less than the desired surrender rate, calculate a surrender bonus designed to encourage surrender; and apply the pre-payment penalty or the surrender bonus to one or more loans within the portfolio of loans.

The computer system may also be configured to direct the loan originator to impose the pre-payment penalty or the surrender bonus as a provision of the loan, separate from any the surrender charge imposed by the insurer.

The computer system may also be configured to retrieve current loan data for one or more loans in the portfolio, the current loan data comprising a start date, a product type, a current age, a carrier identifier, a current cash value, a current surrender charge; compare the current loan data to the surrender data; calculate a similarity factor for estimating the extent of similarity between the current loan data and the surrender data; and if the similarity factor exceeds a similarity threshold, then add the loan corresponding to the current loan data to the select one or more loans within the portfolio of loans selected to receive the pre-payment penalty or the surrender bonus.

The computer system may also be configured to compare a forecast surrender rate to the current surrender rate, the forecast surrender rate based upon an actuarial evaluation performed by or on behalf of the product carrier; request adjustment of the actuarial evaluation based on the current surrender rate; and request an adjustment of the policy-related charges for one or more products based upon the adjustment of the actuarial evaluation. The system may also be configured to request compensation for the calculation of the current surrender rate, the compensation taking the form of an additional commission, an additional loan fee, an additional crediting rate to the policy in the form of a persistency bonus, an additional marketing allowance, or more favorable underwriting treatment. The computer system may also be configured to adjust the terms and provisions of the loan, based upon the adjustment of the actuarial evaluation.

In another aspect, the present invention provides a computer system for managing the total risk exposure for a portfolio of loans, each used to purchase an insurance or annuity product. The computer system may include an accounts management module configured to retrieve payment data from the one or more data tables, the payment data including details about payments received for the loans; maintain a list of instructions based on one or more contractual agreements established between and among the entities related to the portfolio of loans; distribute funds, based on the payment data, according to the list of instructions; and provide an auditable record of the distribution of funds.

The accounts management module may be further configured to prioritize the list of instructions according to the one or more contractual agreements such that the distribution of funds is executed according to the prioritization. The list of instructions may include amounts due to one or more of the entities; cash reserve amounts to be maintained in one or more reserve accounts; and escrow amounts to be maintained in one or more escrow accounts.

In another aspect, the present invention provides a computer system for managing one or more loans, each used to purchase an insurance or annuity product. The computer system may include a plan administration module configured to calculate the loan interest paid on each of the one or more loans during a period, based on the data stored in one or more data tables; and generate a report to the borrower related to each of the one or more loans, the report based at least in part on the data, the report including the calculation of loan interest paid, recommendations about accounting related to the loan under GAAP, and a number of calendar days the product has been in-force during the period. The report may further include recommendations about accounting related to a back-to-back loan arrangement, if present.

In another aspect, the present invention provides a computer system for managing the total risk exposure for a portfolio of loans, each used to purchase an insurance policy, the computer system characterized in that it includes a plan administration module. The plan administration module may be configured to calculate a current death benefit reduction to be applied to one of the policies, based on the data stored in one or more data tables, the data including a current interest rate, a forecasted product yield, a hard minimum and maximum death benefit, a hard minimum and maximum death benefit, tax guidelines, policy requirements, surrender costs, and a past death benefit reduction already applied to the one of the policies; provide a notice to a loan originator or other entity, the notice including the amount of the current death benefit reduction and a date upon which it should be applied; and record the current death benefit reduction in the one or more data tables associated with the one of the policies.

The administration module may be further configured to calculate the current death benefit reduction based at least in part on the collateral for the loan, such that the reduction provides a degree of protection for the collateral. The collateral may be an asset of the borrower pledged to the loan originator as collateral for the loan.

These and other objects are accomplished by the present invention and will become apparent from the following detailed description of a preferred embodiment in conjunction with the accompanying drawings in which like numerals designate like elements.

BRIEF DESCRIPTION OF THE DRAWING

The invention may be more readily understood by reference to the following description, taken with the accompanying drawing figures, in which.

DETAILED DESCRIPTION

Figure 1:
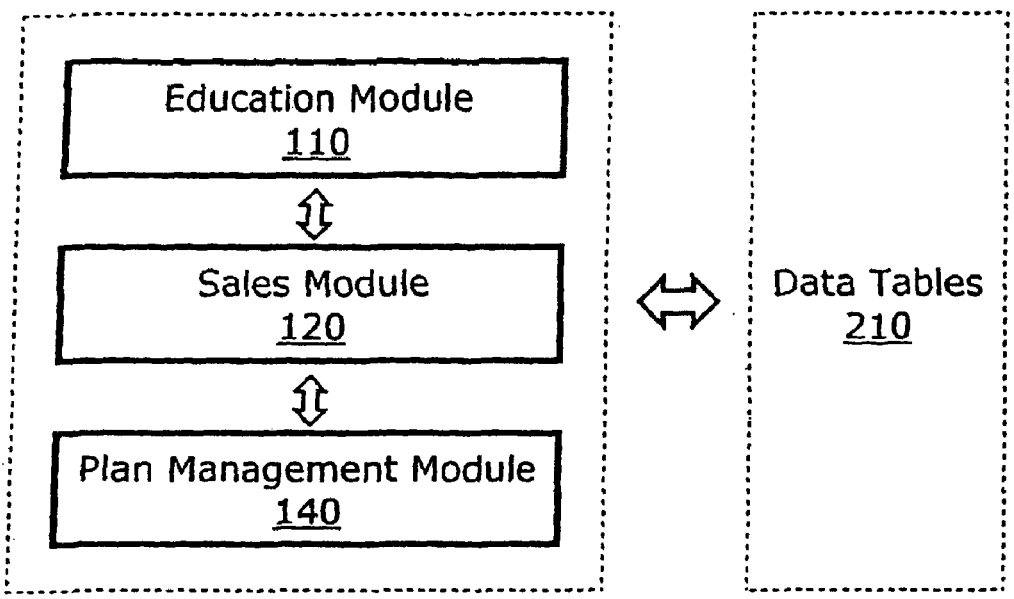
FIG. 1 is a diagram showing several modules and data tables of a computer system, according to one embodiment of the present invention.

Certain illustrative and exemplary apparatuses, systems, and methods are described herein in connection with the following description and the accompanying drawing figures. The examples discussed represent only a few of the various ways of applying the principles supporting the material disclosed and, thus, the examples are intended to include equivalents. Other advantages and novel features may become apparent from the detailed description which follows, when considered in conjunction with the drawing figures, in which like numerals indicate like elements throughout the several views.

Definitions

As used in this application, the term "computer component" refers to a computer-related entity, such as hardware, firmware, software, a combination thereof, or software in execution. For example, a computer component can be, but is not limited to being, a process running on a processor, a processor itself, an object, an executable, a thread of execution, a program, and a computer. By way of illustration, both an application running on a server and the server itself can be a computer component. One or more computer components cans reside within a process and/or thread of execution and a computer component can be localized on a single computer and/or distributed between and among two or more computers.

"Computer communications," as used herein, refers to a communication between two or more computer components and can be, for example, a network transfer, a file transfer, an applet transfer, an Open Database Connectivity (ODBC) connection, a document mail merge, an e-mail, a Hyper-Text Transfer Protocol (HTTP) message, XML, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a Virtual Private Network (VPN), Frame Relay or DSL lines, a circuit switching system, a packet switching system, and so on.

"Logic," as used herein, includes but is not limited to hardware, firmware, software and/or combinations of each to perform one or more functions or actions. For example, based upon a desired application or needs, logic may include a software controlled microprocessor, discrete logic such as an Application-Specific Integrated Circuit (ASIC), or other programmed logic device. Logic may also be fully embodied as software.

"Signal," as used herein, includes but is not limited to one or more electrical or optical signals, analog or digital, one or more computer instructions, a bit or bit stream, or the like.

"Software," as used herein, includes but is not limited to, one or more computer readable and/or executable instructions that cause a computer, computer component and/or other electronic device to perform functions, actions and/or behave in a desired manner. The instructions may be embodied in various forms like routines, algorithms, modules, tools, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel-processing computer components and thus can be loaded and/or executed in serial, parallel, massively parallel, or other manners. It will be appreciated by one of ordinary skill in the art that the form of software may be dependent on, for example, requirements of a desired application, the environment in which it runs, and/or the desires of a designer or programmer or the like.

An "operable connection" (or a connection by which entities are "operably connected") is one in which signals, physical communication flow and/or logical communication flow may be sent and/or received. Usually, an operable connection includes a physical interface, an electrical interface, and/or a data interface, but it is to be noted that an operable connection may consist of differing combinations of these or other types of connections sufficient to allow operable control.

"Database," as used herein, refers to a physical and/or logical entity that can store data. A database, for example, may be one or more of the following: a list, a table, a file, a data store, a relational database, a data table, a queue, a heap, and so on. A database may reside in one logical and/or physical entity and/or may be distributed between two or more logical and/or physical entities. The term database may be understood to include a database management system for controlling the organization, storage, and retrieval of data housed in the database.

A "database management system" refers generally to an interface and one or more computer software applications specifically designed to manage and manipulate the information in a database. An interface generally refers to a computer program designed to provide an operative connection or interface between a user and a software application. The database management system may include a complex suite of software programs that control the organization, storage, and retrieval of data, as well as the security and integrity of the database.

An interface for a database management system may provide a series of commands that allow a user to create, read, update, and delete the data values stored in the database tables. These functions (create, read, update, delete) are sometimes referred using the acronym CRUD, so an interface with those commands may be called a CRUD interface. A database interface that includes a query function may be called a CRUDQ interface.

Query language allows users to interact with a database and analyze the data in the tables. A query is a collection of instructions used to extract a set of data from a database. Queries do not change the information in the tables; they merely display the information to the user. The result of a query is sometimes called a view. One of the best known query languages is Structured Query Language (SQL, sometimes pronounced "sequel"). SQL is one of the standard languages for database interoperability. Queries are probably the most frequently used aspect of SQL, but SQL commands may also be used as a programming tool for building, altering, configuring, and generally maintaining a database.

It will be appreciated that some or all of the processes and methods of the system involve electronic and/or software applications that may be dynamic and flexible processes so that they may be performed in other sequences different than those described herein. It will also be appreciated by one of ordinary skill in the art that elements embodied as software may be implemented using various programming approaches such as machine language, procedural, object oriented, and/or artificial intelligence techniques.

The processing, analyses, and/or other functions described herein may also be implemented by functionally equivalent circuits like a digital signal processor circuit, a software controlled microprocessor, or an application specific integrated circuit. Components implemented as software are not limited to any particular programming language. Rather, the description herein provides the information one skilled in the art may use to fabricate circuits or to generate computer software and/or incorporate hardware technologies in order to perform the processing of the system. It will be appreciated that some or all of the functions and/or behaviors of the present system and method may be implemented as logic as defined above.

To the extent that the term "includes" is employed in the detailed description or the list of exemplary inventive concepts, it is intended to be inclusive in a manner similar to the term "comprising" as that term is interpreted when employed as a transitional word in a claim. Further still, to the extent that the term "or" is employed in the list of exemplary inventive concepts (for example, A or B) it is intended to mean "A or B or both." When the author intends to indicate "only A or B but not both," the author will employ the phrase "A or B but not both." Thus, use of the term "or" herein is the inclusive use, not the exclusive use. See Garner, A Dictionary of Modern Legal Usage 624 (2d ed. 1995).

Introduction

Exemplary systems, methods, and apparatuses are now described with reference to the drawing figures, where like reference numerals are used to refer to like elements throughout the several views. In the following description, for purposes of explanation, numerous specific details are set forth in order to facilitate a thorough understanding of the systems, methods, apparatuses, and the like. It may be evident, however, that the exemplars described may be practiced without these specific details. In other instances, common structures and devices are shown in block diagram form in order to simplify the description.

Many modifications and other embodiments may come to mind to one skilled in the art who has the benefit of the teachings presented in the description and drawings. It should be understood, therefore, that the invention is not be limited to the specific embodiments disclosed and that modifications and alternative embodiments are intended to be included within the scope of the disclosure and the exemplary inventive concepts. Although specific terms may be used herein, they are used in a generic and descriptive sense only and not for purposes of limitation.

For example, the terms "policy" or "product" as used herein should be understood to include a universal life insurance policy, an annuity contract, or any other financial instrument that employs or accomplishes some form of risk transfer and has an invested portion or component that grows in value over time. Similarly, the term "insured" as used herein should be understood to include the person or entity covered by such a policy or product, including for example the annuitant named in an annuity contract. An insured entity, for example, may be a trust created for the benefit of one or more designated beneficiaries.

Although the invention will be described herein in the context of a computer system for managing a plan that involves a loan for a life insurance policy or annuity product, other financial systems may be managed and processed in the same or similar fashion. A loan obtained by an employer and used to buy a policy or product on behalf of an employee, donor, shareholder, or other party affiliated with the employer may be referred to herein as a "compensation loan" because it may act as a form of leveraged compensation. Accordingly, the borrower may also be referred to as the employer providing the compensation loan.

Computer System

As illustrated generally in FIG. 1, one embodiment of the present invention includes a computer system 10. The system 10 may include a plurality of data tables 210 connected to several interconnected modules, including for example an education module 110, a sales module 120, and a plan management module 140.

For FIG. 1 and other drawing figures illustrating computer modules, tables, tools, and the like, it should be noted that such diagrams are intended to provide order to the discussion and not for purposes of limitation. The modules in a computer system using the invention, for example, may be arranged in various orders, with different names, different connections, and may include any of a variety of software tools or routines designed to accomplish the functions described herein.

As shown in FIG. 1, the data tables 210 may include, incorporate, or access one or more databases or relational databases, and may also include a database management system, and an interface with query capabilities. In one embodiment, the data tables 210 may form a relational database, where the data in each table is linked to data in other tables.

In one embodiment, the education module 110 of the present invention may be configured to schedule and monitor the training, education, and development of persons interested in learning about the product delivery, financial planning advantages, and overall dynamics of the plan of the present invention, primarily for the purpose of arranging for the sale of policies or products through the use of borrowed funds. Such trained persons are generally third-party distributors, producers, sales associates or agents, or other commissioned-based persons. The education module 110 may include actual lessons and educational materials provided directly to trainees through computers or over the internet. In one embodiment, the education module 110 tracks the progress of each trainee, from initial registration, through the training process, and into the development or continuing education stage. The education module 110 may also be configured to track graduate trainees by distribution channel to compare commitment levels, track success rates, and provide agency-based incentives and contract validation. The education module 110 may also be configured to provide an analysis of sales results, by class, in order to compare and improve results by tracking business production, efficiency of case submissions, profitability, and case submission history. Data gathered by the education module 110 may be stored in the one or more data tables 210. As with all the modules discussed in the context of the computer system, the education module 110 may be interconnected with other modules in order to share data and information. For example, the trainee data gathered and stored by the education module 110 may be accessible to the sales module 120.

Sales Module

In one embodiment, the sales module 120 of the present invention may be configured to provide statistical, geographic, and historical data about the sale of policies or products under the plan of the present invention. Data gathered by the sales module 110 may be stored in the one or more data tables 210. The sales module 120 may include a forecasting capability based on an analysis of the sales data and statistics.

Figure 5:
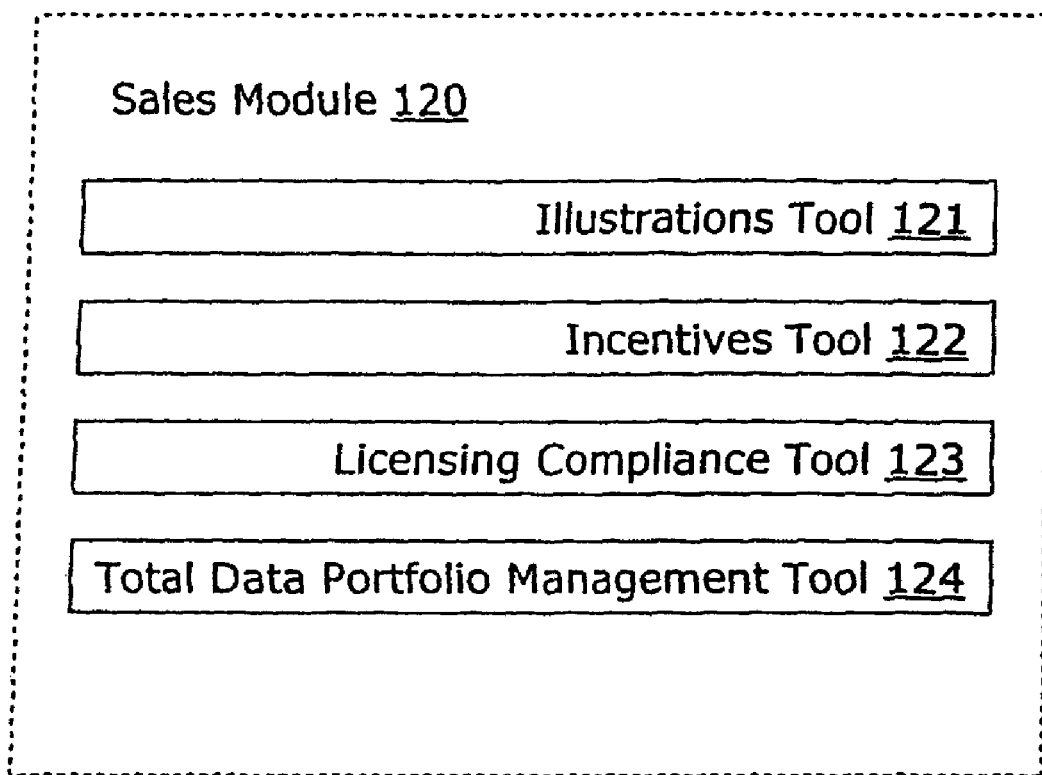
FIG. 5 is a diagram showing a sales module including several tools, according to one embodiment of the present invention.

As shown in diagram form, in FIG. 5, the sales module 120 in one embodiment may include an illustrations tool 121, an incentives tool 122, a licensing compliance tool 123, and a total data portfolio management tool 124, among other features. These tools or functions may be accomplished by software components within the sales module 120 or anywhere in the computer system 10 of the present invention. An illustrations tool 121 may be configured to generate examples of how an investment in a policy or product of the present invention may perform over time. The illustrations tool 121 may also include a comparison to other investments. In one embodiment, the sales module 120 may also include an incentives tool 122 for tracking and calculating the commissioned bonus or other reward due when a policy or product is sold. The incentives tool 122 may be used to track the sales achieved during a particular time period, such as a calendar year or, in one embodiment, during a rolling year based on the date (obtained from the education module 110) when a sales associate completed a training class. The incentives tool 122 may include the capacity to generate a variety of reports, using data gathered by and through different modules of the computer system and stored in the data tables 210. The payment of bonus rewards and incentives may be initiated and distributed by the incentives tool 122.

In one embodiment, the sales module 120 may also include a licensing compliance tool 123, as shown in FIG. 5. The data tables 210, in one embodiment, may include the state insurance license status for each sales associate and each sales agency or company involved in the sale of policies or products. In one embodiment, the licensing compliance tool 123 may produce an alert when a new loan application is filed (or is about to be filed) and the sales agency or any of its sales associates is not currently and properly licensed in the state where the loan application originated. The licensing compliance tool 123, in one embodiment, may attach the alert to the application until it is resolved, and may execute other steps such as sending one or more notices to the parties involved about the licensing deficiency. In one embodiment, the licensing compliance tool 123 may store licensing renewal dates in the data tables 210 for each sales agency and each of its internal sales agents.

In one embodiment, the sales module 120 may also be configured to remind sales associates or agencies to re-visit a borrower, either periodically or in response to updated financial data received regularly by customers, during the term of the loan. Changes in financial status, as well as the passage of time or the occurrence of policy milestones, may represent a potential opportunity for additional business from the customer. In this aspect, the sales module 120 may be configured to help the sales force focus on new business opportunities.

The sales module 120, in one embodiment, may also include a total data portfolio management tool 124 for collecting, collating, and distributing data between and among the various participants in the system and plan of the present invention. The total data portfolio management tool 124 may perform a data gathering or data mining function in order to perform data analysis and disseminate the results to certain participants according to the myriad and overlapping relationships between the marketplace, the policies and products, the distributors, the loan portfolio, and the available capital. The data gathered may be analyzed and the results disseminated to assist in decision-making with regard to sales, distribution, lending capital, and loan portfolio management. At the level of the insurer or carrier, the data results may be used in operations and to support and inform the infrastructural requirements of the carrier for both current and future business needs.

The total data portfolio management tool 124 may be used to collect, collate, and disseminate both un-processed and processed data using the computer system 10 of the present invention. As sellers and distributors of the plan begin to market the policies and products, they will become uniquely qualified and positioned to collect and forward real-time market intelligence about activities and events taking place at the point of sale. As point-of-sale information is gathered, the total data portfolio management tool 124 may categorize the data as objective or subjective intelligence. Objective intelligence may reflect the market condition, program or product-specific objections and opportunities, while subject intelligence may reflect sales-related phraseology and attitudes demonstrated by prospective buyers at the point of sale. As these and other forms of information are gathered and recorded by operational or sales support personnel, the information may be processed by the total data portfolio management tool 124 and stored in the one or more data tables 210 for storage and later review and analysis.

As information is scrutinized and processed by the total data portfolio management tool 124, it may be automatically distributed to sales and marketing analysts for incorporation into updated business strategies, materials, and techniques. The information may also be automatically distributed via the computer system 10 to operational decision makers so they can begin to plan for needed support. Information may be distributed by any number of methods, including but not limited to classroom instruction, electronic media, databases, and web-based and/or intranet-based methods and tools—all generated and distributed by the computer system 10 of the present invention.

The total data portfolio management tool 124 may be configured to provide analysis tools and information to both the front-end management and the back-end technical and administrative support, in order to maximize the usage of all aspects of the present invention which may be useful in delivering loans and their associated policies, products, and services to market. For example, as various objective and subjective intelligence is recorded and analyzed, the results may reside in one or more data tables 210 or system modules associated with all levels of the business. As these data are provided for market and trend analyses, the corresponding capital resources, lending capital, personnel, and other infrastructure may be planned for and reserved in order to enable and preserve efficiency.

As trends reflect more or less robust levels of business volume, the predictive capacity of the total data portfolio management tool 124 may be used to provide statistical analysis as well as the corresponding logical decision-sets designed to expand or contract the internal and external resources necessary to better manage the business, based upon variable cost modeling. Other data representing decisions and planning for both internal and external use may be utilized to record and analyze the sales cycles within indigenous markets, demographics, aggregated and non-identifiable prospecting profiles, product selections, portfolio trending among the lender and product providers, and the market mix of products.

Additional information and predictive sales-related tools may be generated as part of the total data portfolio management tool 124, including case studies, market studies, product studies, profiles of new carrier opportunities and their portfolio mix strength, and the potential licensing of technology, information, know-how, and expertise to third-party users such as rating agencies, carriers, and third-party administrators, loan servicers, and collateral agents.

The data gathered and analyzed by the total data portfolio management tool 124 may be utilized to alter the interest rates and the commissions models for particular loans, policies or products, or for particular carriers. The tool 124 may also be utilized in selecting the most effective carrier or insurer, based on the needs of a particular borrower or insured. Moreover, the tool 124 may be used in recommending the policy or product best suited to the needs of the borrower, the insured, the carrier, or other participating entities.

In one embodiment, the system 10 of the present invention may be configured to utilize the total data portfolio management tool 124 to assist in analyzing carrier policy flow and in forecasting capital needs for reserves, subordination, and warehouse lending. The tool 124 may assist with matching the in-flow of business to the appropriate capital lending mechanism and to effectuate more predictable securitization programs and achieve portfolio quality adjustments over time.

Plan Management Module

A technical solution to the technical problems discussed in the background is provided generally by the computer system 10 of the present invention and, more specifically, by the plan management module 140. As described below, the plan management module 140 of the present invention may be used to continually monitor and calculate the unsecured current gap value of a single policy or product, or a group of policies or products. The monitoring and administrative capabilities of the plan management module 140 may be utilized for a portfolio of policies or products, in order to facilitate the financing, securitization, and credit default swap objectives of the present invention, as described below.

Figure 2:
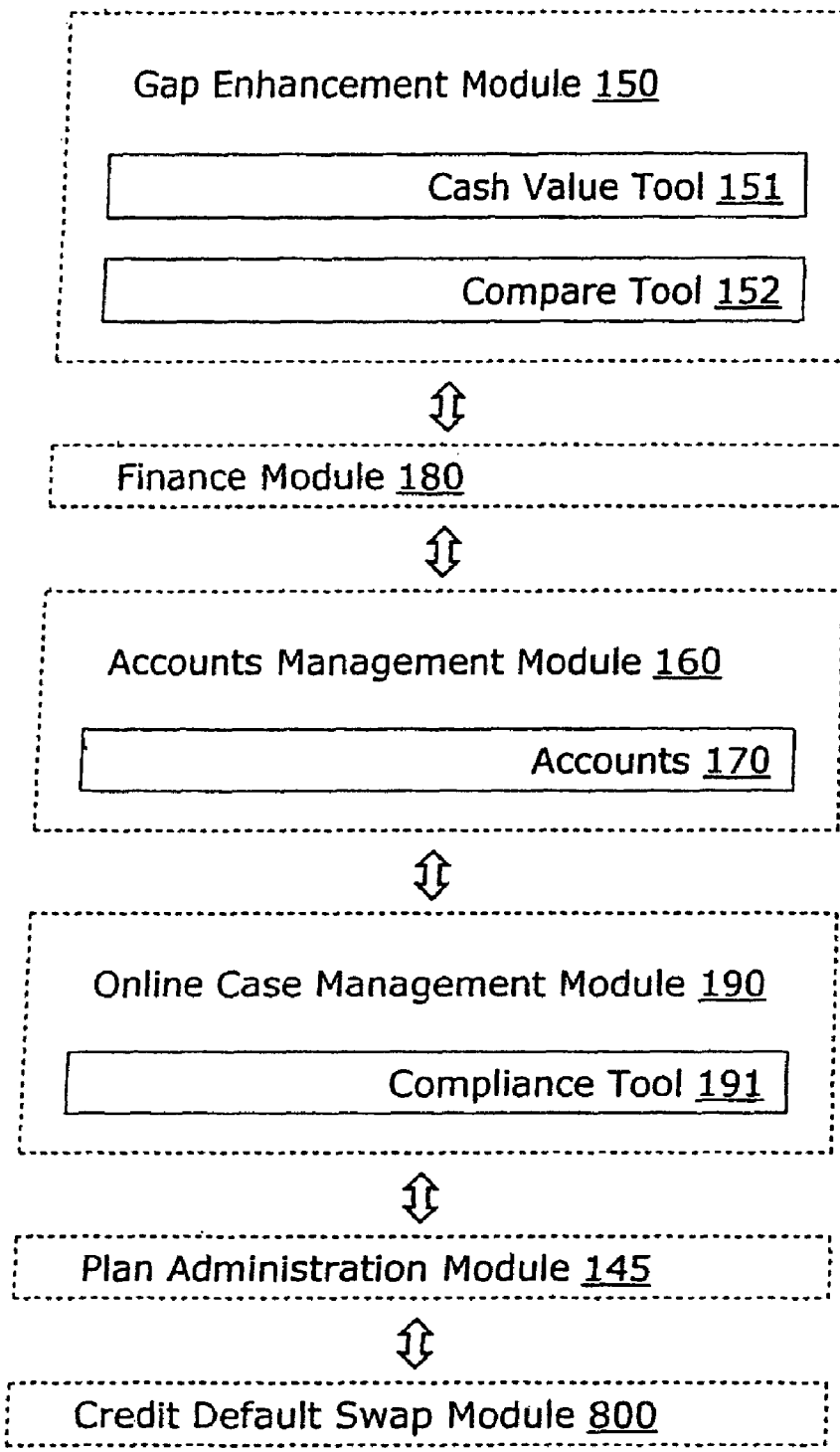
FIG. 2 is a diagram showing several modules of a plan management module, according to one embodiment of the present invention.

As shown in FIG. 2, the plan management module 140 of the present invention may include a gap enhancement module 150, a finance module 180, an accounts management module 160, an online case management module 190, a plan administration module 145, and a credit default swap module 800. Each module of the system 10, as illustrated in FIG. 1, may be operably connected to the data tables 210. The tools and functions of each module, as described herein, may in practice be accomplished by any of the modules, or by more than one. The modules and tools are grouped together to provide order to the discussion and not for purposes of limitation.

As shown in diagram form, in FIG. 2, the gap enhancement module 150 in one embodiment may include a cash value tool 151 and a compare tool 152, among other features. The accounts management module 160 may include access to any of a variety of accounts 170 as established by the plan of the present invention. The online case management module 190 may include a compliance tool 191, among other features. These tools or functions may be accomplished by software components within the plan management module 120 generally or anywhere else in the computer system 10 of the present invention.

Each module within the plan management module 140 will be discussed in greater detail below.

Data Tables

Figure 3:
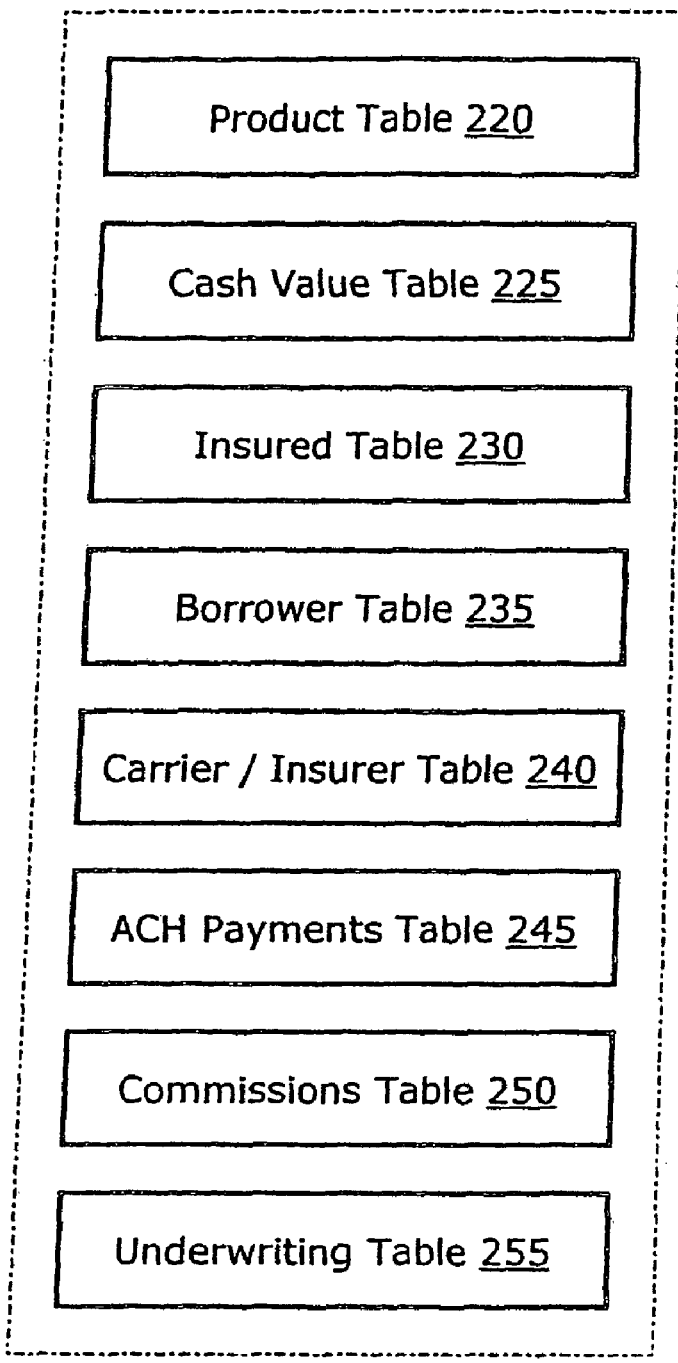
FIG. 3 is a diagram showing a plurality of data tables, according to one embodiment of the present invention.

As shown in FIG. 3, the data tables 210 of the computer system 10 of the present invention may include, incorporate, or access one or more databases or relational databases, and may also include a database management system, and an interface with query capabilities. In one embodiment, the data tables 210 may form a relational database, with each table having one or more key fields used to link the data together. Other constructs and configurations linking data tables are possible and may be desirable.

In one embodiment, the data tables 210 may include a product table 220, a cash value table 225, an insured table 230, a borrower table 235, a carrier/insurer table 240, a payments table 245, a commissions table 250, and an underwriting table 255. Each data table may include a variety of data, depending on the needs of a particular system. The set of data tables 210 illustrated in FIG. 3 is not intended to be exhaustive or comprehensive for all systems.

The product table 220 may include data about each insurance policy or annuity product. The product table 220 may include a variety of data, from simple information like brand name of a policy, to more complex data such as specific formulas contained in the contractual terms of the policy. Such policy terms may include, for example, a guaranteed minimum or maximum return, or relational rates keyed to one or more indices such as the Federal Reserve funds rate, the London Interbank Offered Rate (LIBOR), or the prime lending rate. The product table 220, for example, may include a schedule of surrender charges, growth assumptions, market value adjustments, crediting rates, underlying portfolio data, carrier default risk data based on rating from the major agencies, and any of a variety of information relevant to the policy or product. The product table 220 may be configured to acquire and receive updated information about the product automatically. For example the product table 220 may be configured to receive updated carrier default risk data from the various rating agencies on a periodic or episodic basis. The product table 220 may be configured to receive updates directly from the carrier or insurer about changes in the product. In general, the product table 220 is configured to receive and store current data about each product or policy.

The cash value table 225 may include data about the value of each policy or product in the plan of the present invention. As discussed herein with respect to the gap enhancement module 150, there are a variety of figures and data affecting the current cash value of a policy or product. The cash value table 225 of the present invention provides a database for housing any data related to the calculation and analysis of the cash value of a policy or product.

The insured table 230 may include data about each person named as an insured for each product or policy. The named insured may be a person or an entity, such as a trust with one or more designated beneficiaries. Various data and relevant information about each insured may be stored in the insured data table 230. When the insured is an entity, for example, information regarding the corporate status of the entity may be stored and monitored for its effect on the collateral assignments which, for instance, may be materially altered in the context of a bankruptcy filing by the entity. Also, to the extent the designated beneficiary is a trust, the insured table 230 may include information about the trust, the beneficiaries, the trustee(s), attorney contact information, trust property data, and other relevant data to facilitate efficient plan administration and interaction with the other modules, tables, tools, and features of the computer system 10 of the present invention.

The borrower table 235 may include data about each person or entity borrowing funds related to any product or policy. For example, a borrower may obtain a premium loan and use the proceeds to purchase a policy or product. In one embodiment of the present invention, the borrower may be an employer of the insured person and the loan may be referred to as a compensation loan. The borrower/employer may be making payments on the loan over a number of years. The borrower may or may not be the same person or entity as the named insured. In any scenario, the borrower table 235 may be configured to receive and store data about each borrower, such as the tax identification number, tax return data, profit and loss data, credit scoring, contact addresses, information about each principal member of a corporate borrower, and other details about the borrower.

The carrier/insurer table 240 may include data about each insurance carrier or organization acting as an insurer for each product or policy. Carrier data stored in the carrier table 240 may include basic contact information and other relevant data about the carrier, including the credit rating of each carrier, the value and extent of various credit risks associated with each carrier.

The payments table 245 may include data about the payments made and received toward the balance of a premium loan or compensation loan, as described above. The payments table 245 may be referred to herein as the ACH payments table 245 because it may include data about payments made through the Automated Clearing House (ACH) network, an electronic funds transfer system. Data stored in the ACH payments table 245 may be accessed and retrieved by the accounts management module 160 as part of its function of allocating and distributing payments.

The commissions table 250 may include data about the structure of the commissions paid by a carrier or insurer when a policy or product is sold. Commission structures vary widely among different carriers, and different products or policies. Also, commissions are often paid at different times during the life or term of a policy. For example, an initial commission may be paid when a policy is sold, with additional commissions paid on a quarterly or annual basis, and subsequent commissions paid when additional premium deposits are made into the policy. Because the commissions paid may have a significant affect on the value of the policy at different times, the commissions table 250 may be used to store important data about the commission structure of various policies and when commissions are paid during the term of an active policy or product. The commissions table 250 may be used to track special commission arrangements such as a levelized compensation plan which is sometimes used to manage or reduce the Part One gap, described more fully below. Tracking special arrangements and alterations in the commissions table 250 enables the system 10 of the present invention to coordinate and collect commission payments due from carriers according to the current commission schedule.

The underwriting table 255 may include data about an applicant or borrower who is applying for a premium loan or compensation loan. In one embodiment, the borrower may be considering a loan for the purchase of a policy or product for one or more of its employees for one or more of the following reasons: as leveraged compensation, as a wealth-creation tool for the employee, as an asset protection mechanism for the borrower's asset, as an estate planning device, as part of an ownership transition, as a disciplined savings technique, as a buy/sell funding method, as a reward for employee productivity and loyalty, as an employee retention tool, as educational funding, and as a non-qualified benefit offering. The underwriting table 255 may also be utilized when a borrower may be applying for a loan against the value of a policy or product. Whether the system 10 is facilitating the analysis of a single loan in the application stage, a loan application undergoing underwriting consideration by a loan originator, a loan being evaluated as part of a current closed loan portfolio, or a loan maintained through a loan portfolio or block of loans sold into the public capital markets via securitization, the underwriting table 255 may be used to store important information about the creditworthiness of the applicant or borrower. In addition, data captured and stored in the underwriting table 255 may be used through the system 10 of the present invention for the generation of loan documents, plan administration documents and reports, credit risk assessment functions, and various steps in the financing process such as the VFN program and the securitization process, as described below.

Gap Enhancement Module

When a premium loan or compensation loan is used to purchase a life insurance policy or annuity product, the value of the policy or product itself provides a basic level of collateral security for the loan. Usually, however, there is a gap between the value of the policy and the amount of premium paid, especially at the beginning of the life of the policy. The gap amount changes over time, depending on a variety of variable factors.

The gap amount often has a direct effect on the pricing and other terms of a premium loan or compensation loan and, thus, the gap amount affects the desire and willingness of a borrower, a carrier, a loan originator, or other parties to participate in a leveraged-compensation loan program. The gap amount also affects the lender's default exposure and the carrier's ability to place competitively-priced policies or products. In one aspect, the present invention may be utilized to manipulate, adjust, and otherwise manage the gap amount in order to influence the behavior and decisions of participating entities and to optimize the financial performance and overall results produced by a premium loan or compensation loan, or a portfolio of such loans.

A technical problem exists in the field of premium loans because of the need to identify and evaluate one or more assets or financial instruments that could be used to reduce the gap amount. Placing a value on an asset, and evaluating when and to what extent it may serve as collateral security for a premium loan with a changing gap amount is a technical challenge. Also, the identification and comparison of one or more financial instruments that may be used to achieve more favorable financing terms is a complex technical challenge because of changing interest rates and other variables in the financial markets, especially when multiple loans with different gap amounts are managed as a group. A technical solution to this problem is provided generally by the computer system 10 of the present invention and, more specifically, by the gap enhancement module 150 which may be used to continually monitor and calculate the unsecured current gap value of a single policy or product, or a group of products. The technical effects of this solution include the reduction in the unsecured gap amount, the addition of an asset pledged to secure a loan, the change in status of a generally dormant asset to one that is active and useful, and the improved creditworthiness of a loan for a policy or product protected by the system 10 and gap enhancement module 150 of the present invention.

Figure 8:
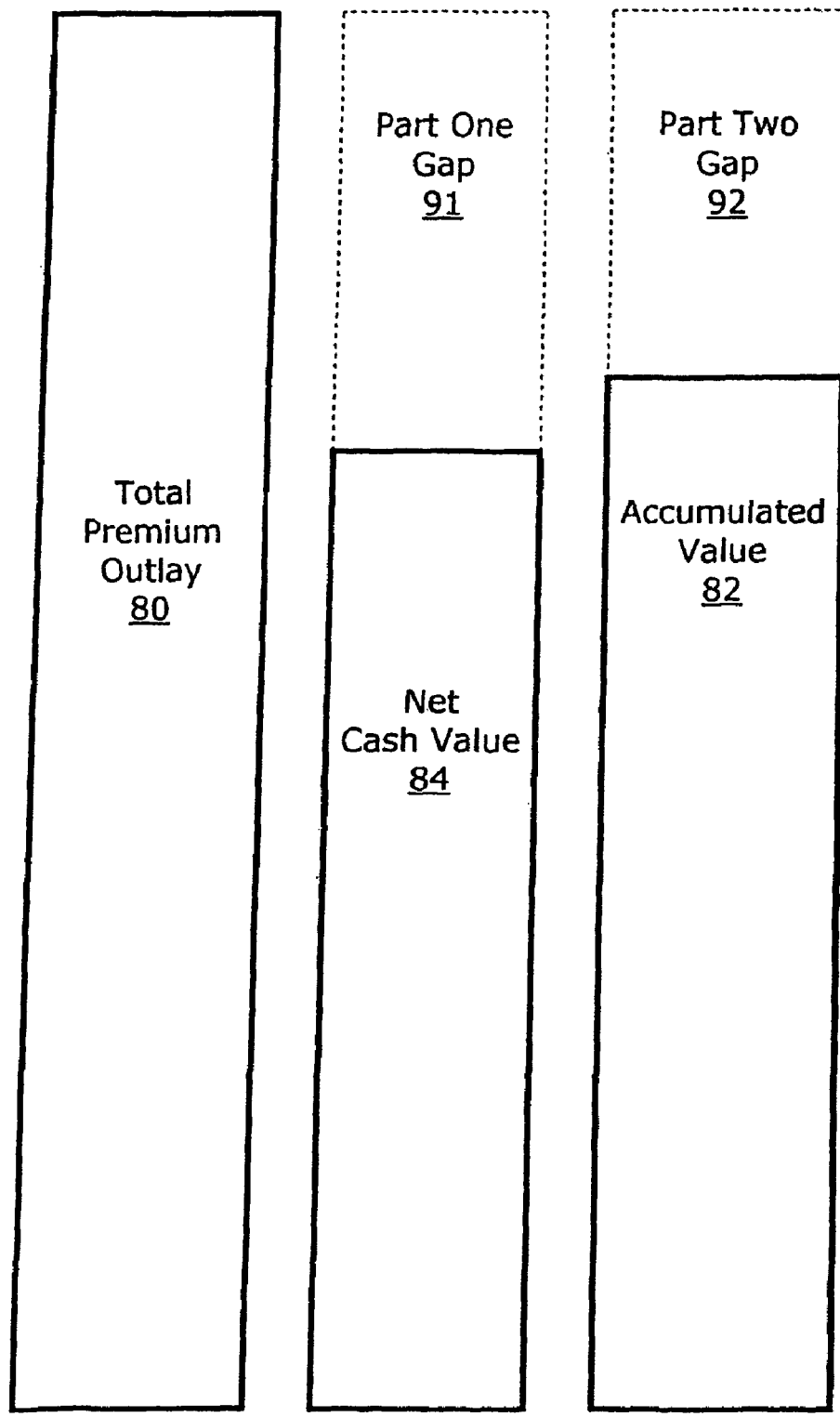
FIG. 8 is a graph illustrating the difference in value between the total premium outlay for a policy and its net cash value, and the difference in value between the total premium outlay and the accumulated value, according to one embodiment of the present invention.

As illustrated graphically in FIG. 8, there is often a gap 91 between the net cash value 84 and the total premium outlay 80 for a policy or product. Similarly, there is often a gap 92 between the accumulated value 82 and the total premium outlay 80. These gaps 91, 92 may be referred to herein as the "part one" gap 91 and the "part two" gap 92. The two gaps 91, 92 combined may be referred to herein as the total gap or the current gap value.

The part one gap 91 exists, in part, because of the actuarial evaluation of the risk that a policy will be surrendered early. When an individual owns a policy or product without any obligations or contractual limitations, the individual insured may decide to cancel the policy in order to obtain the net cash value for another use. The risk of cancellation may also be affected the individual's ability or willingness to continue paying the premium, the occurrence of various life events, and other factors typically factored into an actuarial risk model.

The chance of surrender may be reduced if the contractual obligations are increased to make surrender more expensive. Alternatively, the invention may analyze and calculate an incentive such as a surrender bonus in order to encourage the surrender or the lapse of the policy or product. All insurance carriers include in their actuarial models a percentage of policies expected to be surrendered early; in other words, before the death benefit is paid, for example. In one embodiment, the invention may be configured to analyze and calculate the amount of incentives that can predictably alter the forecasted surrender rates, thus resulting in a higher number of surrendered policies. The surrender incentive mechanism and calculation model of the present invention satisfies the need in the field of insurance to make the surrender rate more predictable and, thus, more accurate from an actuarial perspective.

Figure 6:
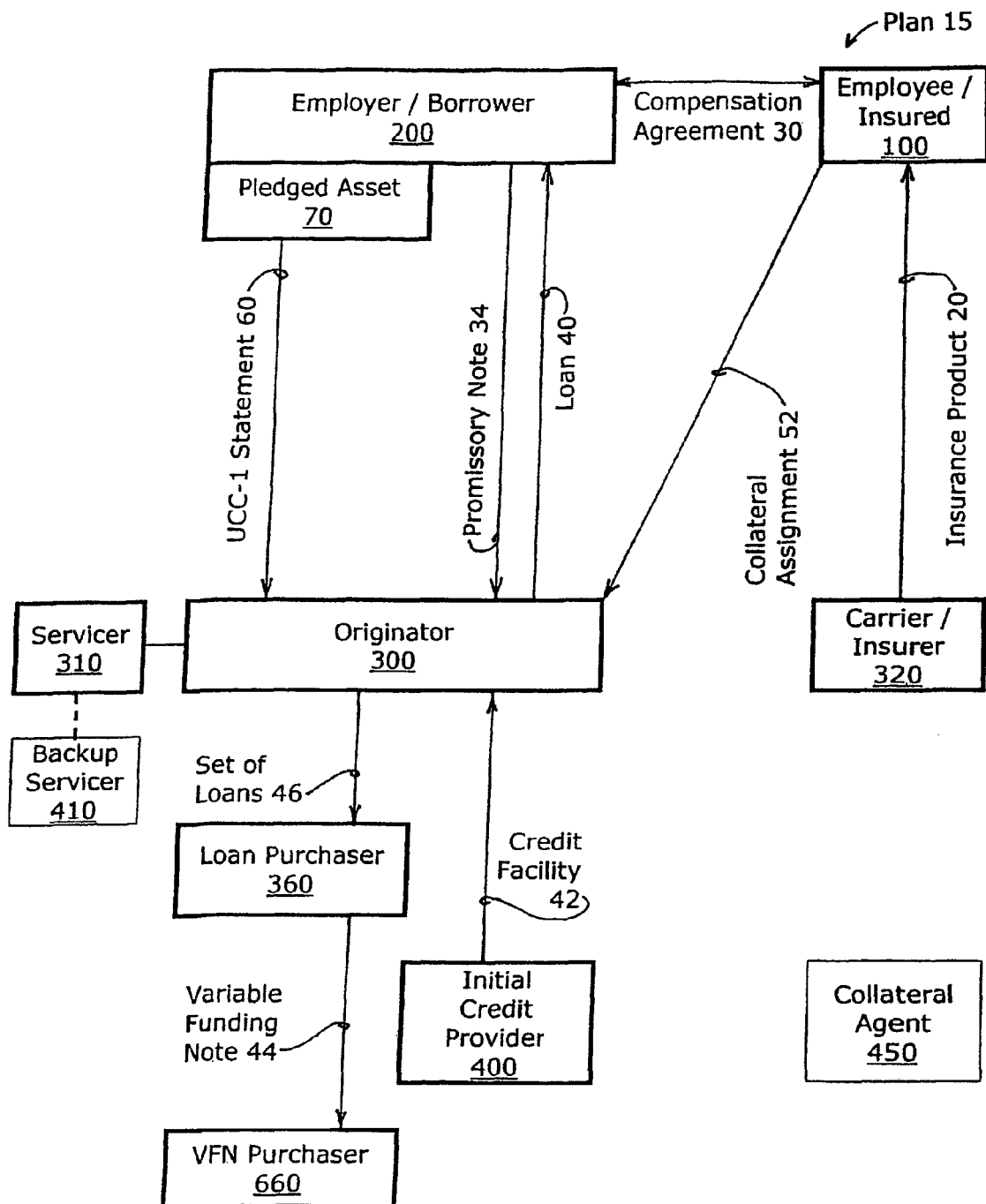
FIG. 6 is a diagram of a financial plan, according to one embodiment of the present invention.

The risk of surrender for a policy within the plan of the present invention, however, is quite different. An example plan 15 is shown in FIG. 6. In fact, the risk of surrender is significantly lower for a policy in the plan 15 because the policy may only be surrendered upon a default of the premium loan or compensation loan 40 by the borrower 200. Within the plan 15, the borrower 200 may be obligated to repay the loan 40 by a promissory note 34 and by a UCC-1 statement 60 evidencing the pledge of an asset 70 as collateral. Moreover, the insured 100 in the plan 15 may not be completely free to surrender or cancel the policy and obtain the cash value 84 because of the collateral assignment 32 executed in favor of the loan originator 300. The insured 100 may also be constrained by a compensation agreement 30 between the insured 100 and the borrower 200 in cases where the borrower 200 is also the insured's employer. Because of these contractual limitations on the insured's ability to execute a surrender and the collateral security provided by the employer's pledged asset 70, the risk of surrender in the context of the plan 15 is much lower.

The part one gap 91 is generally the result of surrender charges imposed for early surrender, contingent deferred fees, market value adjustments, and the like, all of which may be imposed by a carrier in order to recover the costs associated with writing the policy or product, and the expected profits lost, in the event of an early or premature surrender. Over time, these surrender charges and fees tend to decline until a point in the life cycle of the policy or product where the accumulated value 82 becomes equal to or greater than the net cash value, at which point the part one gap 91 reaches zero. The amount of the part one gap 91, relative to the premium outlay 80, will vary over time, as additional policy premium is paid, the surrender charges and fees become less necessary and lower, and the accumulated value 82 of the policy increases.

The part two gap 92 exists, in the context of a universal life insurance policy or an annuity product, because the amount of premium paid or deposited (the total premium outlay 80) is generally reduced by sales loads, fees, premium taxes, miscellaneous charges, and insurance costs. These costs, however, are generally offset by the growth in the product's cash value resulting from the product's crediting rate or market participation. If the compound growth of the cash value exceeds the aforementioned costs, the accumulated value 82 will increase during the active term of the policy. The amount part two gap 92, relative to the premium outlay 80, will vary over time, as additional policy premium is paid, and as the accumulated value 82 grows or declines.

As shown in FIG. 2, the gap enhancement module 150 in one embodiment may include a cash value tool 151 and a compare tool 152, among other features. In general, the gap enhancement module 150 may be configured to calculate the part one gap 91 and the part two gap 92, at any time during the life of the policy or product, based upon data stored in the one or more data tables 210.

Knowing the value of the gaps 91, 92 at particular times provides a user with a measure of the level of risk associated with the policy, and of the default exposure associated with the loan used to buy the policy. For example, on day one of the term of the policy, the gaps 91, 92 may be substantial because the policy may have a low accumulated value 82 relative to the total premium outlay 80, and it may have a low net cash value 84 because of the high initial surrender charges and fees. The net cash value 84 may, in some circumstances, be higher than the accumulated value 82 during the early years of the policy because of the presence of certain surrender charge enhancements or adjustments designed to enhance a policy for corporate or lending applications. Such enhancements or adjustments typically disappear over time and are used to facilitate financing and/or the efficient entry and exit of participating employees in corporate insurance plans. The net cash value 84, however, is generally lower than the accumulated value 82, thus producing the part one gap 91. As the policy remains active and in force over time, the surrender charges decline, the cash value 84 increases, and the investment gains (net of costs) produce increases in the accumulated value 82 over time, the gaps 91, 92 may decrease. The accumulated value 82 may increase or decrease, depending on the relationship between the performance of the carrier's investments and the costs and charges associated with maintaining a particular policy or product. If allowed under applicable agreements, the cash value 84 may decrease if the policy holder borrows cash from the policy or makes a cash withdrawal, which may be restricted under the plan of the present invention. Various other events during the life of the policy will have an effect on the value of the gaps 91, 92.

Operation of the Gap Enhancement Module

The gap enhancement module 150 of the present invention may be configured to calculate the gaps 91, 92 at various times and, thus, monitor the status of one or more policies or products. The two gaps 91, 92 combined may be referred to herein as the current gap value.

Figure 9:
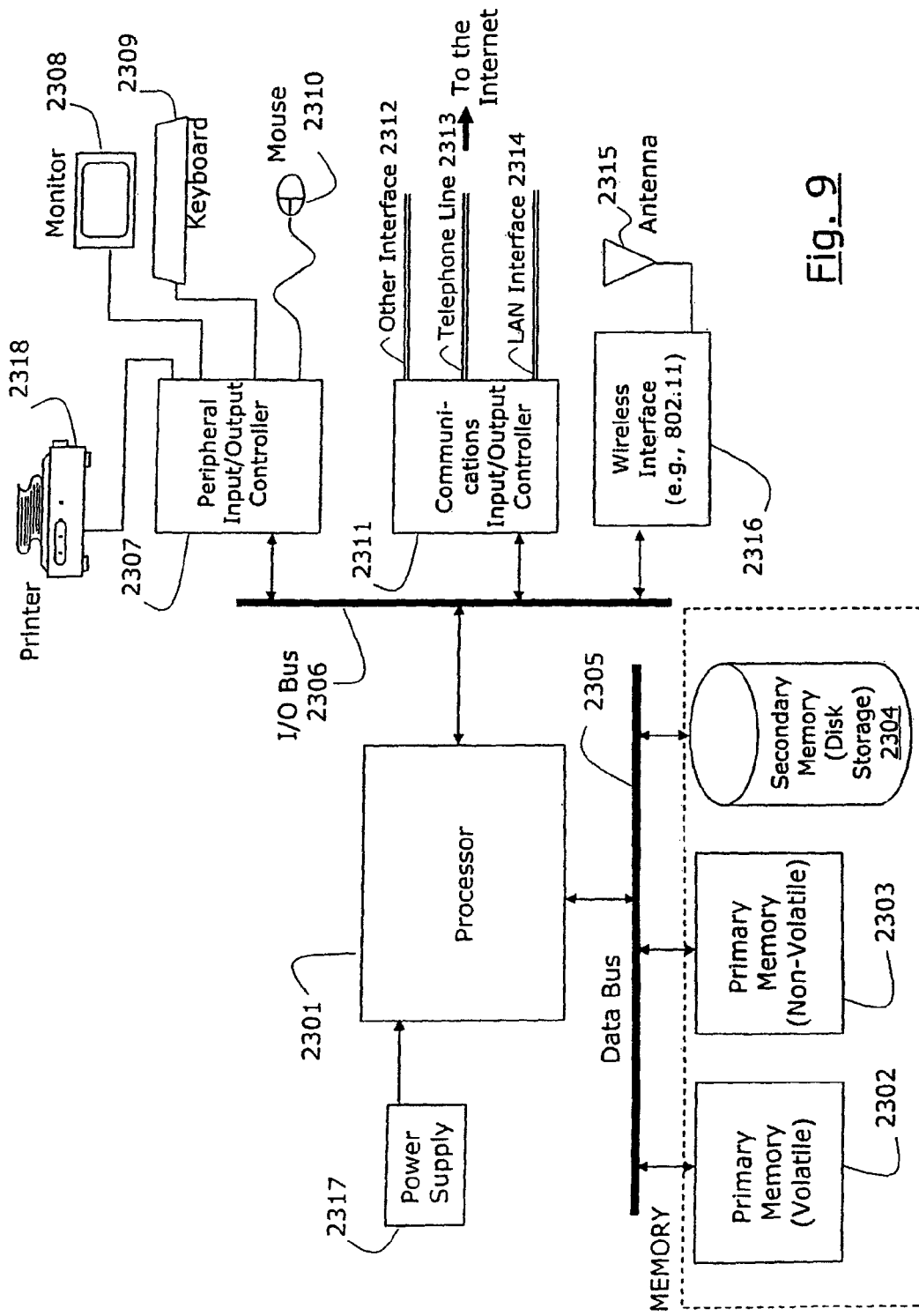
FIG. 9 is an illustration of a computer, according to one embodiment of the present invention.

In one exemplary embodiment, the gap enhancement module 150 may include a computer program module that is executable by a central processing unit in a computer such as the one illustrated in FIG. 9. The gap enhancement module 150 may include programming instructions or may be otherwise configured to access and retrieve data about a policy or product which is stored in one or more data tables 210.

The gap enhancement module 150 may be configured to retrieve data reflecting the current amount at risk, including generally the total premium outlay 80 to date. The module 150 may also be configured to retrieve data about the current value of the product. The gap enhancement module 150, in one embodiment, includes a cash value tool 151 to calculate the current value of the policy or product based, at least in part, on (1) the current net cash value 84 of the product, (2) the current accumulated value 82 of the product, and (3) the current collateral value of the one or more instruments providing collateral security for the underlying loan. The gap enhancement module 150 may also assess the current gap value based on current assumptions, guaranteed assumptions, and/or at varying interest rates. The cash value tool 151, in one embodiment, may be configured to acquire updated data directly from the insurer or carrier about one or more of the above factors affecting the current value. For example, the cash value tool 151 may be configured to send a query to the carrier requesting the current net cash value 82 if the policy or product were surrendered today (net of charges and fees), and to receive the data in response, and store in the one or more data tables 210. The cash value tool 151 may be configured to regularly request and obtain updated policy data directly from the carrier.

Using the data retrieved from the data tables 210, the gap enhancement module 150 may be configured to calculate the current gap value for each policy or product. The current gap value generally represents the difference between the total premium outlay 80 and the current cash value of the policy or product.

The gap enhancement module 150 may be configured to display or otherwise report the current gap value to a user. The current gap value may be useful in assessing the current status of an insurance policy or product, a group of policies or products, or an entire portfolio of policies or products. As described herein, the current gap value of a policy or product may be reduced or otherwise secured by using one or more financial or contractual gap enhancement instruments. If the current gap value is too large, the user may need to identify and obtain additional collateral security for the policy or product. Whether the current gap value is too large depends upon the policy, the user, the loans or other obligations involved, and other parameters related to a particular financial plan or system.

In one embodiment, the gap enhancement module 150 may be configured to compare the current gap value to a limit. The limit may be predetermined or set by the user. The limit may be expressed as a specific dollar amount, as a ratio of selected values related to the policy, as a percentage of the premium outlay 80, or in any other way the user of the gap enhancement module 150 may select. For example, the limit may be set at eighty percent of the premium outlay 80, so that as additional premium is paid or deposited, the dollar value of the limit changes. In this example, if the gap enhancement amounts to twenty percent of the premium outlay 80, then the minimum limit (set at eighty percent) would be satisfied, and no additional gap enhancement would be requested.

If the current gap value is greater than the limit, the gap enhancement module 150 may be configured to identify one or more financial or contractual instruments that offer additional collateral security for the insurance policy or product. These may be referred to as gap enhancement instruments, because when in place they enhance the gap by reducing the gap value and thereby minimizing the default exposure. The available gap enhancement instruments may include a rider on the policy, a change in the commission structure, a loan agreement, a contract provision, or other kinds of contractual obligations between and among any of the parties with an interest in reducing the current gap value. The various gap enhancement instruments are described in greater detail below, in the next section. In one embodiment, the gap enhancement module 150 identifies the instruments that are available if and when the current gap value exceeds the limit.

It is important to note that one or more of the gap enhancement instruments may already be in place. These active instruments may be identified and evaluated by the cash value tool 151 (described above) when it calculates the current value of the policy or product. The current value is based, in part, on the current collateral value of the one or more instruments providing collateral security for the underlying loan. Because they provide collateral security, these are gap enhancement instruments. In this aspect, the cash value tool 151 of the present invention, in one embodiment, takes into consideration those gap enhancement instruments that may be already in place for a policy or product.

If the gap enhancement module 150 determines that the current gap value exceeds the limit, and that additional gap enhancement instruments may be needed, the gap enhancement module 150 may include a compare tool 152. The compare tool 152 may be configured to perform comparative functions among various financial and contractual gap enhancement instruments. The compare tool 152 may be configured to compare the available instruments based on a set of parameters. The parameters may include the relative value of each available instrument, the net cost of executing each instrument, the ease of obtaining each instrument from the party offering it, or any other factor that may be useful in making a comparison. The compare tool 152 may be configured to present a list of the available instruments to a user, along with the comparison parameters or other information about each available instrument. The compare tool 152 may be further configured to receive an indication by the user of the instrument selected. The user may select one or more instruments. Alternatively, the compare tool 152 may be programmed to automatically select one or more instruments according to a built-in priority or preference assigned to each instrument. Each selected instrument may have a variety of tasks, documents, deadlines, and other associated requirements.

The gap enhancement module 150, in one embodiment, may be configured to initiate the process of executing the selected instrument by, for example, generating one or more documents. If, for example, the selected instrument is a policy rider, the gap enhancement module 150 of the present invention may generate a proposed draft of the rider to be presented to the insurer for review, approval, and filing. The gap enhancement module 150 may also generate a timeline or schedule with deadlines for the user to follow, so the selected instrument progresses toward execution in an efficient manner. In this way, the gap enhancement module 150 may monitor the execution process for each selected instrument. By initiating and monitoring the process, the gap enhancement module 150 may facilitate the execution of the one or more selected instruments.

When a selected instrument has been executed or otherwise completed, it will affect the current gap value and, perhaps, other values related to a policy or product. The gap enhancement module 150, in one embodiment, may be configured to update the current collateral value to reflect the expected effect of the new gap enhancement instrument selected. By updating the current collateral value, the gap enhancement module 150 helps keep the data current so that it accurately reflects the present value and status of the policies or products being monitored.

Gap Enhancement Instruments

As discussed generally above, various gap enhancement instruments are available as part of the system 10 and plan 15 of the present invention. The gap enhancement instruments represent an important advance in the art and one of the many advantageous features of the present invention.

The available gap enhancement instruments may include a rider on the policy or product. For example, a rider executed by the carrier or insurer waiving certain fees, such as the surrender charges, would have the effect of increasing the net cash value 84 and reducing the part one gap 91. Within an example plan 15, as shown in FIG. 6, a collateral assignment 32 may be in effect which generally pledges the cash value of the policy to the lender or loan originator. Accordingly, a rider may primarily benefit the loan originator 300 and therefore may not significantly alter the actuarial model as it applies to the insured 100. The waiver of surrender charges may be called a honeymoon rider because it is usually temporary. A rider may expire when the gap declines to a certain level or to zero. A rider may expire after a certain number of years, after a certain policy milestone, or upon the occurrence of some other event.

The available gap enhancement instruments may also include an agreement to change the commission structure for the policy or product. Sales commissions are often taken or credited at the beginning of the life of a policy, thereby contributing to the gap immediately. One way to reduce the gap is by postponing a portion of the commissions, or by leveling or extending the payment of commissions over a number of years, in order to lessen the gap-increasing effect of sales commissions. Vesting and charge-back periods can be adjusted accordingly. By altering commission schedules, the actuarial cost structures can be managed at the carrier level, thereby providing a gap enhancement. Such alterations may be tracked, for example, in the commission table 250.

The available gap enhancement instruments may also include the deposit of sufficient funds in a special reserve account, to pay a portion of the gap in the event of a surrender event or a default on the loan. By structuring a reserve account, the early cash value may be increased. The reserve obligation may be part of a contract provision. Having the funds in reserve to immediately cover the gap reduces the effect of the surrender risk on the policy, and the default exposure on the loan. Moreover, when multiple polices or products are involved, the special reserve account may include funds to cover only some of the policies (not all of them) because a surrender event or default on all the policies simultaneously is unlikely. The contract provisions, for example, may be drafted so that sufficient reserves are maintained for a certain portion or percentage of the policies provided by a particular carrier.

In one contract provision requiring reserves, for example, the contract may include a commitment by the carrier to place in a reserve account an amount of funds roughly equal to the expected gap value. The funds in reserve may represent the amount of the sales commission earned by a sales agent, or the amount of the marketing allowance or other fee earned by the loan servicer or loan originator. The marketing allowance may include funds paid outside of commissions, solely at the carrier's discretion, to cover the costs associated with marketing the policy or product. The marketing allowance is frequently based on production volume. Accordingly, the contract provision may also include a commitment by the sales agent or the loan originator to leave the funds in reserve until the current gap value is reduced by other factors, after which time the funds may be withdrawn.

The funds in reserve may also represent production bonuses (based on sales volume), persistency bonuses (based on the longevity of a policy or product in the carrier portfolio), commission holdbacks (commissions spread over a period of years), convention credits (for conventions or trip attendance), or other compensation structures or amounts held from the sales agent or producer. Reserves can later be adjusted and funds returned based upon the actual surrender and default experience, versus the projected experience used to set the target reserve values.

The available gap enhancement instruments may also include a loan agreement pledging to pay a portion of the gap value in the event of a surrender event. Such a loan arrangement may be made between a loan servicer or the loan originator, for example, and the carrier or insurer, in an amount sufficient to cover all or a portion of the gap. The terms and provisions of such a loan may provide that: (a) the insurer will pay the total gap amount in the event of a default on the loan by the borrower, and (b) the loan servicer or originator would then have a re-payment obligation to the insurer in the same amount. In the context of the plan 15 of the present invention, as shown in FIG. 6, in one embodiment, this re-payment obligation of the insurer would be ultimately secured by the employer's pledged asset 70 and by a right of set-off of any commissions earned by the loan servicer 310 or originator 300 in favor of the insurer 320. For a plan 15 that includes multiple policies and products 20, the loan terms may include commissions earned with respect to all the lender-funded policies 20 written by a particular insurer 320 (as opposed to the single surrendered policy or defaulted loan). In this aspect, the ongoing relationship between the loan servicer 310 or originator 300 and one or more participating insurers 320 may be leveraged to provide additional collateral security for any of a number of active policies 20 in the plan 15.

The available gap enhancement instruments may also include a combination of features. As described above, a rider executed by the carrier may include a waiver of certain surrender fees and charges. A rider that includes a waiver of surrender charges in favor of the lender or loan originator, however, may not extend to the borrower. Although the lender would be made whole, the obligation for the surrender charges may be borne by the borrower in the event of a loan call or default. Passing the surrender charges on to the defaulting borrower may achieved through a series of agreements between the carrier, the commissioned sales entity, and the lender, as illustrated in the following example:

An insurance contract is purchased in two (2) equal payments of $200,000 to the carrier. In the second contract year, a default or loan call occurs, and the cash surrender value of the contract is $320,000. Upon this occurrence, the insurance contract is surrendered and the sum of the $320,000 is returned to the lender in accordance with the collateral assignment. The carrier immediately advances $80,000 to the commissioned sales entity; however, the sum is paid directly to the lender. The lender subsequently repays its $400,000 obligation to its funding source, and simultaneously assigns the remaining borrower's obligation (in the amount of $320,000) to the commission sales entity. The commission sales entity collects from the borrower, either from its pledged asset or otherwise, and then repays the carrier out of the proceeds obtained from the borrower, or in the alternative, out of the proceeds of future commissions.

Influencing Surrender Rates to Optimize the Plan

The computer system 10 of the present invention represents a technical solution to the technical problems discussed in the background, including, for example, the gap enhancement module 150 of the computer system 10 which, in one embodiment, may be used to influence the surrender risk related to a policy or product. In addition, the gap enhancement module 150 of the present invention has the technical effect of changing the actual surrender rate, adjusting the actuarial evaluation of the surrender risk, affecting the premium charged for a particular policy or product, and changing the terms and provisions of a loan obtained to pay the premium.

Early Surrender: The gap enhancement module 150 of the present invention has been discussed in terms of its configuration for analyzing the gaps 91, 92 and evaluating the possible gap enhancement instruments available, in order to reduce the current gap value. A policy rider, for example, is a gap enhancement instrument wherein the carrier waives certain surrender charges, which has the effect of increasing the net cash value 84 and reducing the part one gap 91. Such a rider, however, also has the effect of making a surrender less costly to the insured and, therefore, more likely to occur during the term of the policy. In general, the lower the penalty, the higher the probability the insured will surrender the policy.

In one embodiment, the gap enhancement module 150 of the present invention may be configured to add a pre-payment penalty to a loan in order to increase the costs associated with surrender and thereby dissuade the insured from surrendering the policy. The pre-payment penalty may be imposed by the loan originator 300 or loan servicer 310, not by the carrier 320. Although the penalty represents a real cost to be paid if and when a policy is surrendered, the penalty itself is not part of the surrender charges assessed by the carrier 320 and, therefore, it generally does not increase the unsecured gap value. Accordingly, the gap enhancement instruments and other collateral security remain in place to bolster the value and creditworthiness of the policy or product, even though the penalty is decreasing the likelihood of an early surrender. The presence of the penalty may change the actuarial evaluation of the risk that a policy will be surrendered early, but it does so without increasing the gap value.

Thus, the pre-payment penalty may be used to influence the probability of a surrender event. Of course, the amount of the pre-payment penalty may vary over time, in order to influence the surrender probability during various specific periods in the term of the policy. The gap enhancement module 150 may be configured to monitor a plurality of policies or products over time, setting the pre-payment penalty and monitoring the surrender frequency, and storing data in the data tables 210. In one embodiment, the gap enhancement module 150 may be further configured to analyze the data, using a regression analysis for example, and based on the results provide optional pricing and actuarial assumptions for certain policies. In this aspect, the carrier may offer one or more policies that have a different benefit or a different premium cost, depending on the amount of a pre-payment penalty put in place by the loan originator or servicer.

On a broader scale, in terms of the policies and entities participating in the plan 15 of the present invention, each surrender event may have an economic effect on one or more of the various entities in the plan 15, with some incurring costs and others receiving income from the event. The gap enhancement module 150 of the present invention may be used to adjust or set the pre-payment penalty at a level that produces optimal results for the entities in the plan 15, by influencing the number of policies that are surrendered early. For example, suppose standard policies with no pre-payment penalty have an average surrender rate of five percent (5%) within the first three years. The gap enhancement module 150 and the data for the system 10 of the invention may determine that an average surrender rate of two percent (2%) would produce improved or more optimal results for the plan 15 as a whole. Accordingly, the pre-payment penalty may be instituted or increased, to discourage surrender, and in time help lower the rate from 5% to 2%.

Conversely, the system 10 and data may indicate that a higher surrender rate of twenty percent (20%) would be optimal. In this scenario, the pre-payment penalty may be decreased or eliminated, in order to neutralize the effect of a penalty on the surrender decision, and in time help raise the rate from 5% to 20%. Alternatively, the pre-payment penalty may be replaced with a surrender bonus, in order to actively encourage surrender, which would help raise the surrender rate from 5% to 20%. In this aspect, the pre-payment penalty or surrender bonus may be used to influence surrender frequency, and the corresponding policy persistency, for policies or products in the plan 15.

Surrender Later in the Term: The amount of the pre-payment penalty (or the surrender bonus) may vary over time, in order to influence the surrender decision in the desired direction during various specific periods in the term of the policy. For example, the insured may elect to surrender the policy or product, or allow it to lapse, and then pay-off the underlying loan 40. A default or other failure to pay the loan may also force a lapse of the policy, and the insured would then obtain the cash value of the policy less the surrender charges and prepayment penalties. Insurance carriers assume a certain number of policies will lapse or be surrendered, as part of their actuarial modeling. However, this modeling has historically been based on accumulated actuarial methodology, not on the active monitoring and adjustment mechanisms like that provided by the present invention, and the innovative gap enhancement mechanisms that the invention facilitates.

A surrender event may occur toward the end of the policy term, when the insured may prefer to collect the cash value now and forego the death benefit. In some instances, paying the cash value in a surrender event costs the carrier less than paying the death benefit. Accordingly, in the plan 15 of the present invention, a surrender bonus may be included in order to actively encourage surrender. The savings to the carrier, in one embodiment, may be shared with the loan originator or other entities in the plan 15, according to one or more agreements between and among the participating entities. The entities may agree, for example, to deposit funds into a surrender reserve account for the purpose of paying surrender bonuses.

As with the pre-payment penalty and surrender bonus described above, the gap enhancement module 150 may be configured to monitor a plurality of policies or products over time, store data in the data tables 210, and calculate an optimal surrender bonus in order to encourage a desired surrender rate or frequency. By adjusting the surrender bonus at various times, for various products, a surrender rate that produces optimal results for the entities and participants in the plan 15 may be achieved.

The surrender rate or frequency may affect the premium pricing and actuarial assumptions for certain policies and products. By storing and analyzing data about policies and surrender events over time, the gap enhancement module 150 of the present invention may be configured to analyze the data and provide results to the one or more participating carriers who, in turn, may provide policies or products with different premium costs or benefit amounts depending upon the presence and amount of a surrender bonus provided during certain periods or at milestones during the term of a policy.

The plan 15 of the present invention, therefore, may include one or more penalties or bonuses to be applied to selected policies or products in order to influence the decisions of participating insureds, in order to optimize the financial performance and other characteristics of the plan 15 as a whole. The penalty or bonus strategy may be applied to all policies within a loan portfolio or, alternatively, selected policies with similar or disparate characteristics may be aggregated into a portfolio in order to achieve predictable financial results that are more easily sold into the public capital markets. The monitoring and administrative capabilities of the plan management module 140 may be utilized for a portfolio of policies or products, in order to facilitate the financing, securitization, and credit default swap objectives of the present invention.

The computer system 10 of the present invention, including the various modules and tools and the data tables 210, of course, may be used to gather, store, retrieve, analyze, and otherwise process current and historical data about the policies and products in the plan 15. In this aspect, as the plan 15 grows and matures in the number and variety of participating carriers and policies, then plan 15 and the computer system 10 may be configured to analyze the data, produce various predictive models and forecasts, and establish penalties or bonuses as incentives to the participating entities such that the overall performance of the plan 15 is enhanced.

The Finance Module Solution: Analyze the Aggregate Value and Risk for a Portfolio of Loans In one aspect, the system 10 of the present invention provides a technical solution to the problem of analyzing and monitoring the gap amount of multiple policies, and thereby assessing the default exposure for the underlying premium loans or compensation loans. The computer system 10 of the present invention and, more specifically, by the finance module 180 may be used to combine or pool a group of loans into a portfolio, calculate an aggregate risk for the entire portfolio, and provide these results to a credit provider in order to obtain financing.

The computer system 10 of the present invention, therefore, provides a system and method for assessing the value, risk, default exposure, and general creditworthiness of a loan portfolio, for the purpose of evaluating the merits of the portfolio as a securitizable asset pool, for making decisions regarding credit enhancement and subordination, and for managing the default exposure.

Grouping multiple loans together in a portfolio produces several notable technical effects. First, the aggregate yield of the portfolio becomes more stabilized, resulting in a more predictable risk/return profile, which in turn results in a higher credit rating than would be assigned to any of the single loans. Also, the various risks that might affect a single loan negatively may have relatively little impact on the portfolio as a whole. The resulting portfolio of loans has a higher dollar value and produces a diversified, hedgeable risk pool with more manageable characteristics. For example, the overall gap value for a portfolio of loans may be enhanced and managed using techniques similar to those described above for individual loans, but to greater effect.

The system 10 may be used to display, report, analyze, hedge, or assist in hedging the total unsecured gap value of the policies in the portfolio. The pooling of loans allows the system 10 to manage the pool like a portfolio. The system 10 may be configured to monitor certain aggregate levels of the portfolio, such as monitoring the risk exposure of borrowers in a given industry, in a particular geographic region, or having a particular policy type, etc. Accordingly, the system 10 may be used not only to trigger the need for gap enhancement instruments for the policies and products already in force, but it may also assist in managing and altering the portfolio over time so that the new policies and products accepted will assist in achieving a desired risk profile for the entire portfolio. As noted herein, the techniques for influencing surrender may be used to optimize the usefulness of the plan, such as by adding or waiving the carrier's surrender charges, by adding or waiving pre-payment penalties, or by adding or waiving surrender bonuses. Similar techniques may be used to affect and even effectively create a desired credit rating for a particular loan portfolio. The present invention may be configured to analyze and provide data on the various adjustment strategies that may be used to bolster the value and creditworthiness of a loan portfolio, thus predictably altering the portfolio exposure in order to permit lenders, investors, and other financial intermediaries the opportunity to offer optional pricing assumptions with respect to lending, securitizations, hedging, and other capital markets product offerings. In addition, the system 10 may also be configured to observe carrier ratings, policy trends, overall portfolio trends, and the like, to assist in making decisions about individual loan rates and terms, based on the risk profile of the loan portfolio as a whole. For example, if a carrier rating downgrade is expected, the rates for that carrier's policyholder participants may be increased in anticipation of the downgrade, thereby enabling the early purchase of risk protection mechanisms.

The plan management module 140, in one embodiment, may be used to evaluate and manage the total risk exposure for a loan portfolio by ensuring the appropriate reserves and subordination amounts are maintained, while maximizing the amount of funds available for alternative uses, including outside investment. In this aspect, the computer system 10 has the technical effect of making funds available for investment that may be otherwise unavailable.

Having a large pool of loans in a portfolio, in general, creates access to capital that would generally not be available for a single loan. When enhanced by collateral security and current data provided by the computer system 10 and modules of the present invention, having a large pool of loans not only creates access to capital but also creates access to much more favorable rates.

At a first level, in response to the enhanced security of the underlying loans, and the aggregate risk and yield calculated for the entire loan portfolio by the finance module 180, a credit provider may extend a credit facility for financing a loan portfolio at more favorable terms than would otherwise be available.

At a second level, the system 10 of the present invention may be used to enhance a loan portfolio to such a high level of security that a block of loans may be financed using variable funding notes (VFNs). The finance module 180, in one embodiment, may coordinate the issuance and purchase of VFNs in order to facilitate the financing of a block of loans enhanced by the system 10 of the present invention.

At another level, the loan purchaser who issued one or more VFNs to purchase one or more blocks of loans may transfer a block of loans in a true sale transaction to a bankruptcy-remote special-purpose entity, thereby further enhancing the credit rating of the block of loans. Such a transaction may be financed by an investment bank on terms generally more favorable than the original first-level credit facility, and often more favorable than the terms of the VFNs.

At yet another level, the quality and extent of the collateral security enhancements provided by the system 10 of the present invention may produce assets of sufficient quality to allow the loan purchaser to transform a block of loans into an asset-backed security. Securitization of the blocks of loans held by the loan purchaser may be accomplished, typically with the participation of an investment bank. Each block of loans may qualify as sufficient collateral to permit the issuance of security interests, such as asset-backed commercial paper, medium-term notes, or other instruments traded and sold into the capital markets.

In one embodiment, the finance module 180 and the overall computer system 10 of the present invention may prompt the creation of a new market for trading blocks of loans, in the form of asset-backed security instruments. The present invention includes a trading system for managing and controlling the buying and selling of security interests in a block of loans enhanced by the system 10 of the present invention. In this aspect, a trading floor generally for the loan market may be created, monitored, and maintained as part of the system 10 of the present invention.

The system 10 of the present invention may also be configured to hedge or assist in the hedging of certain concentrated risks, such as the carrier default risk, through the derivatives marketplace for insurance-based products. As shown in FIG. 2, the system 10 may include a credit default swap module 800, discussed more fully below.

The levels of financing made possible by the computer system 10 of the present invention are discussed again below, in the context of an inventive plan 15 of the present invention.

An Exemplary Plan

The system 10 of the present invention, as described, may be used in the context of a loan obtained and used to purchase a life insurance policy or annuity contract. For example, a policy or product may be purchased by an employer for one or more of its employees, as a form of leveraged compensation. The loan originator, in one embodiment, may engage in leveraged compensation transactions with individuals, corporations, charitable organizations, educational institutions, and other entities.

Figure 7:
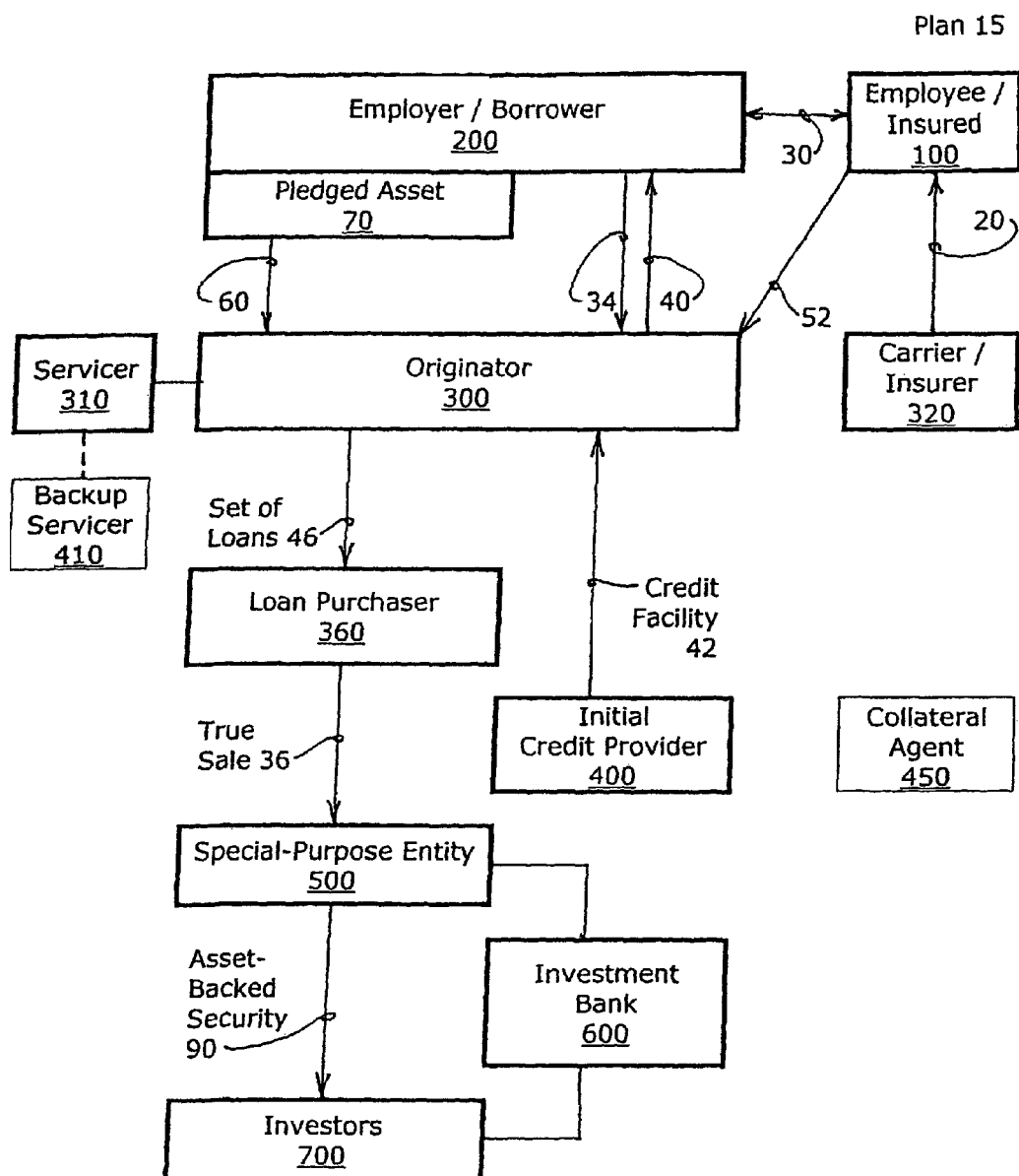
FIG. 7 is a diagram of a financial plan with securitization, according to one embodiment of the present invention.

As described above, the system 10 of the present invention may be used to actively monitor and enhance the collateral security for one or more loans in order to facilitate financing, at favorable terms, and ultimately to facilitate securitization. The collateral security, as described above, may involve one or more gap enhancement instruments managed by the system 10 of the present invention. In one exemplary embodiment, the present invention may include a financial structure or plan 15 as illustrated in FIGS. 6 and 7.

As shown in FIG. 6, the plan 15 of the present invention may include an insurance product 20, such as a universal life policy or an annuity product. The value of the policy or product 20 may accumulate over time. A policy or product 20 in the plan 15 may grow in value, tax-free or tax-deferred, providing a compound return on the insurance or annuity product 20. Different products have different risk profiles, thereby affecting the cost of funds borrowed to purchase them. The different risk profiles are caused in part by the additional costs incurred to hedge the credit risks for a particular carrier.

The plan 15 may include an employee or insured 100, an employer/borrower 200, a loan originator 300, and a carrier or insurer 320. The plan 15 may include a compensation loan 40, from the loan originator 300 to the borrower 200, for the purpose of purchasing the policy or product 20. The employee 100 may be the named insured and may be the owner of the policy 20. The employer 200 may use the loan proceeds to purchase a policy 20 for or on behalf of its employee 100. The purchase may be treated as a form of compensation to the employee 100, as a loan, or as any other kind of transaction. If the loan proceeds are transferred to the employee 100, the employee 100 may have an obligation to purchase the policy or product 20 with the loan proceeds.

The insured 100 is receiving a benefit, perhaps as a kind of compensation, in the form of an insurance policy or annuity. The employer/borrower 200 funded this compensation through borrowing. The plan 15 may include an employee compensation agreement 30 between the insured employee 100 and his or her employer 200.

When the loan 40 is executed, the employer/borrower 200 may sign a promissory note 34 or other agreement to pay the loan 40. In one embodiment, the employer 200 may make interest-only payments on the loan 40. The promissory note 34 provides a basic level of security for the loan 40 because it memorializes the repayment obligation of the borrower 200.

The plan 15 of the present invention is different from traditional premium financing for several reasons. Although traditional premium financing may not require personal guarantees, it generally requires deposit accounts or liquid assets plus the cash value of a policy or product. The plan 15 of the present invention may utilize one or more assets because of the gap enhancement mechanisms described herein. Traditional premium financing does not involve any gap enhancement mechanisms. Also, under the plan 15 of the present invention, the insured 100 owns the policy or product 20, and the increase in value, over time, will generally accrue to the insured 100. The named insured 100 may be a person or an entity, such as a trust with one or more designated beneficiaries. The loan 40, however, was made to the employer 200, not the insured 100. A personal guarantee from the insured 100 for the loan 40 is not required, which is one factor that removes the plan 15 from the realm of traditional premium financing. The fact that the loan 40 is secured by the borrower's assets and the value of the policy itself, instead of by the traditional forms of collateral (such as the insured's deposit accounts), also removes the plan 15 from the realm of traditional premium financing. For these reasons, in one aspect, the plan 15 of the present invention is generally not subject to the extensive regulations governing premium financing and traditional lending.

The plan 15 of the present invention, in one embodiment, represents a method or system of securing a loan 40 for a policy or product 20. The method or system may include the promissory note 34, the pledged asset 70, the collateral assignment 32, a compensation agreement 30, and/or any of a plurality of gap enhancement instruments.

In situations where the borrower 200 is an employer of the insured 100 and the product is purchased as a form of compensation, the plan 15 of the present invention also represents a leveraged compensation arrangement. The inventive arrangement may include the product 20, the loan 40, the promissory note 34, the pledged asset 70, the collateral assignment 32, a compensation agreement 30, and/or any of a plurality of gap enhancement instruments.

Forms of Collateral Security

The computer system 10 and plan 15 of the present invention represents a technical solution to the technical problems discussed in the background. More specifically, the plan 15 of the present invention includes the identification of an asset that can be used to reduce the gap amount; specifically, the employer/borrower 200 in the plan 15 may pledge a particular asset as collateral for the loan 40, thereby adding an asset for inclusion and analysis by the computer system 10 when accomplishing its gap enhancement function. The plan 15 of the present invention solves the technical problem by identifying the asset. The computer system 10 solves the technical problem, and produces a variety of technical effects, by and through the process of valuing the asset, comparing it to the other forms of collateral security, and evaluating when an instrument pledging the asset may be necessary or desired in order to enhance the collateral security for the underlying loan 40.

In addition to the promissory note 34, the employer 200 may identify any number of assets 70, such as the employer's accounts receivable, work in process, real estate, liquid securities, equipment, inventory, property or any other non-cash business or personal asset to pledge as collateral security for the loan 40. In one embodiment, such asset or assets 70 may be pledged as collateral at or near the time when the loan 40 is first obtained. The value of the collateral may be assessed by the computer system 10 of the present invention and the value data may be stored in one or more data tables 210 for inclusion when the current collateral value is calculated by the system 10.

The employer 200 may authorize the filing of a UCC-1 statement 60 evidencing the pledge of an asset 70 as collateral for the loan 40. Financing statements under the UCC (Uniform Commercial Code) are state law devices existing in each state and are used to perfect a security interest in the collateral specified in a statement 60. To perfect a security interest is to lock-in priority over other creditors in the event of a potential bankruptcy. The statement 60 itself does not create a security interest; the security interest may be created by a collateral assignment 52, described below. To the extent the plan 15 of the present invention may be put to use outside the U.S., similar legal devices and requirements would be followed. The UCC-1 statement may be filed with the appropriate authority as a record of the pledge. In practice, the UCC-1 statement 60 may take the form of a lien filed by the loan originator 300. In the event the insured 100 has a legal interest in the pledged asset 70, the insured 100 may also allow the filing of a separate UCC-1 statement evidencing the pledge of the insured's interest in the asset 70.

In one embodiment, the present invention includes a method of transforming a dormant asset into an active, working asset that generates value for the borrower/employer 200 and the employees who participate in the plan 15 as insureds 100. A financial asset such as the accounts receivable or a physical asset such as a fleet or aircraft, for example, which may sit dormant and un-utilized for decades, may be transformed using the plan 15 of the present invention into a working asset 70 when pledged as collateral for a loan 40.

In addition to the promissory note 34 and the UCC-1 statement 60, the insured 100 may execute a collateral assignment 32 of the cash value of the policy 20 as collateral security for the loan 40. The collateral assignment 32 may be executed by the insured 100 in favor of the loan originator 300.

Although the loan 40 is evidenced by the promissory note 34, enhanced by the UCC-1 filing, and partially secured by the collateral assignment 32, there may remain a difference (i.e., a gap) between the premium paid and the actual current value of the product 20 at any given time. As described above, the gap remains generally unsecured by collateral in most arrangements.

The loan 40 from the loan originator 300 to the employer 200 may be used to purchase the insurance or annuity product 20 by paying the amount of the premium due, either all at once or in several installments. Paying all or most of the premium early in the life of the policy 20 provides more cash to be invested sooner, so the value of the policy 20 increases more quickly than with traditional monthly premium plans.

The total premium outlay 80 may determine the amount of the death benefit under the policy or product 20. A higher premium outlay 80, for example, may result in a higher death benefit. For certain policies or products 20, the amount of death benefit may change during the term of the policy, depending upon the total premium outlay 80 paid for a particular period. Certain rules, in various jurisdictions, govern the payments of premium and the adjustment of death benefit or face amount. In one embodiment, the system 10 of the present invention may include an online case management module 190 and/or a compliance tool 191 configured to display and monitor compliance with these rules in each jurisdiction. The online case management module 190 may be part of the plan management module 140 as shown in FIG. 2. The compliance tool 191 may be configured to track the rules in each jurisdiction and store information about the steps required to satisfy the rules.

In one embodiment, the compliance tool 191 may produce an alert when a new loan application is received from a certain state, notifying and reminding the user of the rules for that jurisdiction. The compliance tool 191, in one embodiment, may attach the alert to the application until it is resolved, and may execute other steps such as sending one or more notices to the parties involved. The online case management module 190 may be configured to initiate and execute to completion certain adjustments designed to satisfy the rules in the jurisdiction, and may include an analysis of the product during and after the early period. In this aspect, the premium outlay 80 and the terms of the product 20 are followed by the plan 15 on a periodic basis.

Phases of the Plan

The plan 15 of the present invention may proceed through one or more consecutive phases. The plan management module 140 of the system 10 may be configured, in one embodiment, to automatically generate documents during various phases of the plan, such as loan applications, closing documents, contracts, statutory filings, letters, proposals, projections, and other documents used during the various phases. In one embodiment, the plan 15 my include the general phases of underwriting, funding, and cash management.

Underwriting: Because the plan 15 of the present invention creates a specific set of risks and responsibilities between and among multiple parties, the plan 15 of the present invention may include a unique set of underwriting criteria. In one embodiment, the set of underwriting criteria includes an analysis of the cash flow of the borrower or employer 200 and an analysis of the pledged asset 70; typically, the firm's accounts receivable, real property, equipment, inventory, or other asset. The analysis of the cash flow of the borrower 200 may be performed because of the gap enhancements which are put into place for all or most of the loans 40. Cash flow is one of the prevalent factors in estimating a loan's long-term viability. The loan originator 300 may conduct an annual review of the borrower's cash flow situation based on tax returns or other documents. Also, the loan originator 300 may require an accounts receivable aging summary from the employer 200 for the most recent calendar quarter prior to closing, for example, and the loan originator 300 may require quarterly aging summary reports thereafter.

The loan originator 300, in one embodiment, may retain the option to call the loan 40 if a significant decrease in the cash flow and/or value of the pledged asset 70 (i.e., the amount of the accounts receivable) and thereby exit a deteriorating arrangement. In addition, the underwriting criteria may include a comprehensive evaluation of the employer's business and the client's creditworthiness. In one embodiment, the plan 15 of the present invention may include the retrieval of a credit history for each participant, either manually and/or online through a secured link so the data and information may be downloaded into the computer system 10 of the present invention. The plan 15, in one embodiment, may also include the completion of a matrix scoring system, a client credit worksheet, automated underwriting, a review of the proposed loan closing documents, and automated notification of certain triggering events such as missed payments, loan default, carrier credit downgrades, and other factors affecting the overall credit analysis.

Funding: The funding phase of the plan 15 of the present invention, in one embodiment, may include the following general tasks or steps described below. The transmission of requests may be accomplished by mail, by facsimile transmission, electronically, telephone, telex, or any other method. The funding steps may be accomplished by one or more modules of the computer system 10 of the present invention.

Information about the participants 100, 200, 320 and the product 20 may be collected and sent to the collateral agent 450. In one embodiment, this information may be transmitted via a secured communications link. The information transmitted may include complete, closed files, including underwriting documents, loan documents, advance requests, and other documentation needed or requested to initiate the funding.

Requests for initial and subsequent fundings may be transmitted to any of the various sources of funds in the plan 15, including through a collateral agent 450. For example, the funding phase may include the issuance of a variable funding note 44. Requests for additional or different gap enhancements or collateral security instruments may be transmitted to one or more insurance carriers 320 having a policy or product 20 in the plan 15.

Cash Management: After initial funding is underway or completed, the cash management phase of the plan 15 of the present invention may begin. The cash management phase, in one embodiment, may include the general management of the cash transactions and a general oversight of the application of the proceeds of the collateral, which is governed by one or more agreements between the parties participating in the plan 15.

Management of the cash transactions within the plan 15 may be accomplished through the use of an accounts management module 160, as illustrated in FIG. 2. The accounts management module 160 may be configured as part of the plan management module 140 of the computer system 10 of the present invention. Online or electronic services may be used in order to execute certain funds exchanges, such as the automated clearing house (ACH) network. The accounts management module 160 is described in more detail below.

Levels of Funding

As described above, the system 10 of the present invention provides a technical solution to the problem of analyzing and monitoring the gap amount of multiple policies, and thereby assessing the default exposure for the underlying loans. The finance module 180 of the present invention, in one embodiment, may be used to combine a group of loans into a portfolio, calculate an aggregate risk for the entire loan portfolio, calculate an aggregate yield for the portfolio, and provide these results to a credit provider in order to obtain financing on favorable terms.

The plan 15 of the present invention, and the computer system 10 as described above, facilitates access to funds at various levels of financing on relatively attractive terms because of the quality of each loan 40 as an asset. Creating access to funds is one of the technical effects of the present invention. In this aspect, the unique structure of the plan 15—together with the adequacy and the high quality of the collateral for each loan and the multi-faceted gap enhancements provided by the system 10—creates access to a much larger pool of funds, from various sources, that would otherwise be unavailable. As shown in FIG. 6 and FIG. 7, the plan 15 produces high-quality loan assets sufficient to enable the initial loan originator 300 to:

(a) obtain a credit facility 42 from a initial credit provider 400 on favorable terms;

(b) sell a set of loans 46 in a true sale 36 to a loan purchaser 360, who may either:

(i) issue variable funding notes 44 to a VFN Purchaser 660, and/or (ii) prepare blocks of loans for trading as an asset-backed security 90 or other security interest suitable for trading in the capital markets by multiple investors 700.

Each successive level of funding represents, in general, an increase in the amount of funds available and an improvement in the financing terms or cost of funds.

At a first level, in response to the enhanced security of the underlying loans, and the aggregate risk and yield calculated for the entire loan portfolio by the finance module 180, a credit provider may extend a credit facility for financing a pool of loans at more favorable terms than would otherwise be available. Referring again to FIG. 6, the plan 15 of the present invention includes a growing number of participating employers 200, each requesting a loan 40 for a policy or product 20 covering one or more of its employees 100. As the demand for the plan 15 grows, the funds required for the loan originator 300 to issue multiple loans 40 also grows. Accordingly, the plan 15 in one embodiment may include a funding bank referred to as the initial credit provider 400. The initial credit provider 400 may extend a line of credit or credit facility 42 to the loan originator 300. The plan 15 may also include, as shown, a collateral agent 450 to act as a clearinghouse and agent for matters dealing with the credit facility 42. The plan 15 may also include, as shown, a backup servicing agent 410 for administration of the credit facility 42. The collateral agent 450 and backup servicer 410 may be the same entity.

The initial credit provider 400 is willing and able to extend a credit facility 42 to the loan originator 300, in large part, because of the gap enhancements and other collateral security instruments described. The underlying loans 40 enjoy a degree of security not found in other plans. The extent of security provided may also improve the borrowing terms of the credit facility 42. In other words, the interest rate on the credit facility 42 may be significantly lower because of the quality of the loans 40. In this aspect, the unique structure of the plan 15, and the enhancements provided and monitored the computer system 10, facilitates financing that would otherwise be unavailable for an insurance product.

The present invention, in one embodiment, includes a credit facility extended for the purpose of financing a plurality of loans 40 participating in the plan 15 of the present invention. Because the credit facility structure is made possible by the features and benefits of the present invention, the credit facility structure is part of the present invention.

Financing by Variable Funding Note

At a second level, the system 10 of the present invention may be used to enhance a portfolio of loans to such a high level of security that a block of loans may be financed using variable funding notes (VFNs) 44. The finance module 180, in one embodiment, may coordinate the issuance and purchase of VFNs 44 in order to facilitate the financing of a block of loans enhanced by the system 10 of the present invention.

Because the loans 40 are adequately secured, the plan 15 of the present invention may include financing by variable funding notes 44. The use of VFNs 44 is generally limited to loan obligations that are secured by interests in adequate and high-quality assets. In the plan 15 of the present invention, as shown in FIG. 6, the loan originator 300 may bundle loans 40 together into a set of loans 46 and sell them to a loan purchaser 360. The loan purchaser 360 may then issue a variable funding note 44 which is bought by a VFN purchaser 660. The extent and quality of the collateral security underlying the set of loans 46 vastly improves the terms of each VFN 44, thereby providing an attractive source of funds for the loan originator 300. With the ability to obtain funds at the favorable lending rate of VFNs, the loan originator 300 can offer loans 40 at more attractive rates and otherwise improve the functioning of the plan 15. The VFNs, for example, also enable the loan originator 300 to rely less upon the initial credit facility 42, which may be limited to a certain maximum amount.

When the loan originator 300 receives the proceeds of the VFN 44, the loan originator 300 may make a payment to the initial credit provider 400 and, in effect, pay down the balance due on the credit facility 42, so that more funds can be accessed using the credit facility 42. In this aspect, the VFNs 44 help the loan originator 300 secure additional operating funds to make additional loans 40.

The system 10 of the present invention permits the use of VFNs 44 in the area of life insurance and annuities. The system 10 facilitates access to capital by aggregating a pool of smaller loans into a larger, diversified, hedgeable risk pool with manageable characteristics. For both the insured employee 100 and the contract owner/employer/borrower 200, the pooling mechanism allows them to invest at long-term rates in general account insurance and annuity products, while enabling the loan originator 300 to access capital at short-term rates.

The present invention, in one embodiment, includes a structured finance system comprising one or more variable funding notes 44 issued for the purpose of financing a plurality of loans 40 participating in the plan 15 of the present invention.

Sale to a Special-Purpose Entity

At another level, the loan purchaser who issued one or more VFNs to purchase one or more blocks of loans may transfer a block of loans in a true sale transaction to a bankruptcy-remote special-purpose entity 500. Such a transaction may be financed by an investment bank on terms generally more favorable than the original first-level credit facility, and often more favorable than the terms of the VFNs.

FIG. 7 is similar to FIG. 6, except for the special-purpose entity 500 shown below the level of the loan purchaser 360. Instead of issuing a variable funding note 44, the loan purchaser 360 may sell the set of loans 46 to a special-purpose entity 500 in a true sale transaction 36.

In one embodiment, the loan purchaser 360 may be established as a special-purpose entity 500 qualified to receive the block of loans in a true sale transaction 36. In this embodiment, the two entities 360, 500 as shown in FIG. 7 would collapse into one entity.

True sale is a legal concept related to whether the loans would be considered to be assets of the loan originator 300 or the loan purchaser 360 in the event of a bankruptcy. If the loan originator 300 were to become insolvent and seek legal protection under the applicable bankruptcy laws, the true sale 36 acts to protect the loan purchaser 360 from the potential delays and impairments of its rights to the collateral. Outside the U.S., other countries have a legal concept similar to true sale. The proceeds of the true sale transaction 36, of course, provide funds to the loan originator 300. The proceeds of the true sale 36, for example, may be used to execute additional VFNs 44 or to pay down the credit facility 42.

Securitization & Trading

Just as the underlying security of the loans 40 facilitated the credit facility 42 and the VFNs 44, the high quality and extent of the collateral underlying the loans 40 in the plan 15 is sufficient to permit the loan purchaser 360 to transform each set of loans 46 into an asset-backed security 90. Typically, with the participation of an investment bank 600, the plan 15 of the present invention may include the securitization of sets of loans 46 held by the loan purchaser 360. Each set of loans 46 may qualify as sufficient collateral to support the issuance of an asset-backed security 90, including for example highly-rated commercial paper, VFNs, medium-term notes, longer-term debt instruments, or other securities suitable for trading in the capital markets. As illustrated in FIG. 7, the plan 14 may include the trading of blocks of loans to create an asset-backed security 90 that may be bought and sold in the capital markets to multiple investors 700.

The ability to securitize the loans related to the acquisition of an insurance policy or product is made possible by the unique structure of the plan 15, and the enhancements provided and managed by the computer system 10 of the present invention. Together with the inventive structure of the plan 15, the computer system 10 creates an adequate amount of high-quality of collateral for each loan 40 provided by the gap enhancements and the various collateral security instruments.

The asset-backed securities 90 may create a new market for trading blocks of insurance-related loans 40. The trading market may be similar in some ways to the market for mortgage loans. The plan 15 of the present invention may also include a companion system for trading asset-backed securities 90.

The present invention, in one embodiment, includes a structured finance system comprising one or more asset-backed securities 90 each representing an interest in one or more blocks or pools of loans 40 executed according to the plan 15 of the present invention.

The present invention, in one embodiment, includes a method of securitization of insurance-related loans executed according to the plan 15 of the present invention.

Credit Default Swaps

As shown in FIG. 2, the system 10 may include a credit default swap module 800. When blocks of loans are grouped together and managed as a portfolio, the system 10 of the present invention may also be configured to hedge or assist in the hedging of certain concentrated risks, such as the carrier default exposure, through the derivatives marketplace for insurance-based products.

Credit default swap premiums are established in many ways, including probability modeling of the default exposure for a given pool of assets. The pool may include assets of a specific carrier pool, which may further define the credit exposure on a comparative basis. In the present invention, for example, a credit default swap premium may be established by analyzing a portfolio of loans 40 having similar credit spreads, terms, and credit quality; and the loans may be grouped together by carrier for analysis. Credit default spread premiums are based on the recovery rate of the underlying assets, which may equal at a minimum the amount that can be recovered in the event of a default of that asset, and increased by any interim return or other asset value build-up that occurs while the asset is held.

The credit default swap module 800 may be configured to provide regression modeling of the loans in a portfolio, analyze similar characteristics, historical spreads and returns, and provide predictive modeling to inform the derivative marketplace for these insurance-based products.

The module 800 may also be configured to track the range of events that might trigger the activation of rights under a credit default swap, such as bankruptcy, failure to make timely payments, ratings downgrade below threshold amounts, and other similar events.

The module 800 may be further configured to identify similar assets that might be inserted in place of the defaulting asset, if a substitution right exists in the swap, such that the risk is further reduced to the buyer of the swap protection, which may further enhance the value proposition of the present invention. The module 800 may also be configured to establish a valuation of assets within the pools and use such valuation for purposes of substitutions of assets or payouts under the credit default swap instruments.

Accounts Management Module

The computer system 10 of the present invention represents a technical solution to the technical problems discussed in the background, including, for example, the accounts management module 160 of the computer system 10 which, in one embodiment, may be used to apply and allocate the loan payments received from multiple participating borrowers 200 in order to satisfy the existing contract terms and to direct funds toward certain gap enhancement instruments selected by the system 10 during its periodic evaluation of the collateral security supporting each loan 40. In addition, the accounts management module 160 of the present invention has the technical effect of producing an accurate, verifiable, and auditable record of accounts.

Figure 4:
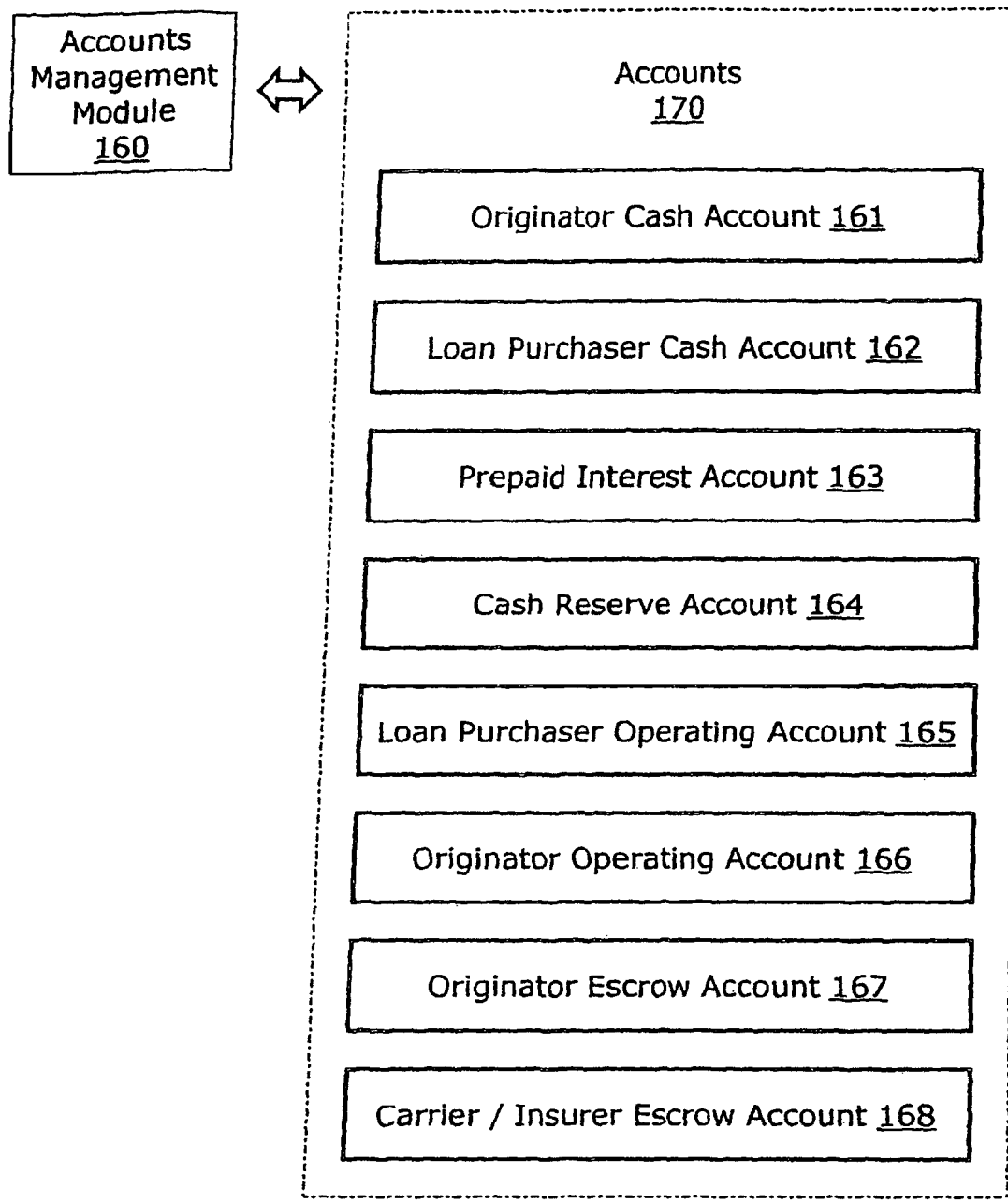
FIG. 4 is a diagram showing an accounts management module linked to a plurality of accounts, according to one embodiment of the present invention.

The waterfall or cascade of funds paid or allocated to various participating parties in these financing arrangements on a periodic basis may be managed and executed, in one embodiment, by the accounts management module 160 of the present invention. The funds within the plan 15 may be distributed between and among various accounts, according to one or more contractual agreements between and among the participating entities in the plan 15. As illustrated in FIG. 4, the accounts 170 may include an originator cash account 161, a loan purchaser cash account 162, a prepaid interest account 163, a cash reserve account 164, a loan purchaser operating account 165, an originator operating account 166, an originator escrow account 167, and a carrier escrow account 168.

The agreements between and among the participating entities in the plan 15 may include a comprehensive set of rules and distribution schedules for the disbursement of payments and fees received during the life of a policy 20 within the plan 15. As described above, the employer 200 may be making interest-only payments on the loan 40 to the loan originator 300. As illustrated in FIG. 6 and FIG. 7, the plan 15 includes a variety of other entities. The accounts management module 160 may be configured to perform the various calculations required to allocate the funds between and among the various entities involved in the plan 15, and to initiate and direct the execution of any funds transfers required by the agreements.

In one embodiment, the accounts management module 160 of the present invention may be configured to receive one or more payments in a period, and allocate the funds as described and required by the existing agreements. Money deposited into the originator cash account 161, for example, may be held in trust by the collateral agent 450 and then applied in a particular order and in accordance with a set of priorities established in the agreements governing the plan 15. The following example illustrates the breadth and scope of the capability of the accounts management module 160 to manage multiple accounts and to execute multiple instructions according to established priorities within each account.

The accounts management module 160 may be configured to receive and deposit a portion the loan payments from the borrowers 200 into the originator cash account 161. First, a fee may be disbursed to the collateral agent 450 or backup loan servicer 410 for their services during the month or period. Second, a fee may be disbursed to the lender or loan originator 300. Third, a fee may be disbursed to the loan servicer 310. Fourth, a fee may be paid to the initial credit provider 400, in accordance with the terms and provisions of the credit facility 42, for example. Fifth, an additional fee may be disbursed to the collateral agent 450 or backup loan servicer 410. Sixth, the remainder may be deposited into the loan originator operating account 166.

Next, the accounts management module 160 may be configured to receive and deposit a portion the loan payments from the borrowers 200 into the loan purchaser cash account 162. First, a fee may be disbursed to the collateral agent 450 or backup loan servicer 410 for their services during the month or period. Second, a fee may be disbursed to the lender or loan originator 300. Third, a fee may be disbursed to the loan servicer 310. Fourth, a fee may be disbursed to the collateral agent 450, the paying agent, and the registrar. Fifth, a fee may be disbursed to the paying agent on behalf of the holders of the variable funding notes 44. Sixth, a deposit may be made to the prepaid interest account 163. Seventh, an additional fee may be disbursed to the collateral agent 450 or backup loan servicer 410. Eighth, a deposit may be made into a cash reserve account 164. Ninth, the remainder may be deposited into the loan purchaser operating account 165.

The prepaid interest account 163 may be managed by the accounts management module 160 which, in one embodiment, may be configured to receive a deposit from the loan purchaser cash account 162, make a payment to the paying agent on behalf of the holders of the variable funding notes 44, and then make payments to one or more borrowers 200 at the direction of the loan servicer 310. The accounts management module 160 may be configured, for example, to maintain a certain minimum amount in the prepaid interest account 163, such as an amount equal to two months of interest on the one or more variable funding notes 44. In this aspect, the accounts management module 160 facilitates compliance with the one or more agreements between and among the parties, facilitates the efficient operation of the plan 15 and system 10 of the present invention, and produces an accurate, verifiable, and auditable record of accounts.

The cash reserve account 164 may be managed by the accounts management module 160 which, in one embodiment, may be configured to receive a deposit from the loan purchaser cash account 162, make a payment to the paying agent on behalf of the holders of the variable funding notes 44, and then move an excess amount to the loan purchaser operating account 165. The accounts management module 160 may be configured, for example, to maintain a certain minimum amount in the cash reserve account 164, such as an amount equal to two percent (2%) of the one or more variable funding notes 44. In this aspect, the accounts management module 160 facilitates compliance with the one or more agreements between and among the parties and also provides a level of cash security for the loan portfolio under management.

The loan purchaser operating account 165 may be managed by the accounts management module 160 which, in one embodiment, may be configured to receive a deposit from the loan purchaser cash account 162, receive a deposit from the cash reserve account 164, and receive a deposit at the direction of the loan purchaser 360. The accounts management module 160 may be configured, for example, to maintain a certain minimum amount in the loan purchaser operating account 165, such as an amount equal to the balance held in the cash reserve account 164. In this aspect, the accounts management module 160 facilitates compliance with the one or more agreements between and among the parties and also provides a level of cash security and liquidity for the participating loan purchaser 360.

In cooperation with the other modules of the computer system 10, and the information stored in the data tables 210, the accounts management module 160 may be configured to monitor and track a plurality of variable funding notes 44 including the current balance, the total amount committed, and other information important to the efficient and accurate management of the funds in the system. The accounts management module 160 may also be configured to monitor the applicable interest rate for the month or period, based on one of the indices for example, such as the London Interbank Offered Rate (LIBOR), including the applicable interest rate for each of a plurality of variable funding notes 44 and the interest paid on the current balance during the period. In this aspect, the accounts management module 160 monitors and tracks the actual interest payments for each set of loans and each VFN 44, and produces an accurate, verifiable, and auditable record.

As illustrated by the preceding example, the accounts management module 160 of the present invention facilitates compliance with the one or more agreements between and among the parties, facilitates the efficient operation of the plan 15 and system 10 of the present invention, and produces an accurate, verifiable, and auditable record of accounts.

Plan Administration Module

As shown in FIG. 2, the system 10 of the present invention may include a plan administration module 145. In one embodiment, the plan administration module 145 may generate annual mailings of plan administration information packets to the participating borrowers for reference when preparing their annual income tax forms. The packet may contain basic information on the back-to-back loan arrangement (i.e., a Section 7872 loan arrangement, under the U.S. Internal Revenue Code), instructions regarding accounting under generally-accepted accounting principles (GAAP), the calculation of loan interest paid, and information regarding the number of days the policy or annuity has been in force during the calendar year. A template report document may be linked and generated via an ODBC connection, with specification information for each borrower being retrieved from the data tables 210 and inserted in to the appropriate fields in the template. The plan administration module 145 may be configured to calculate the loan interest automatically. The packets may also be used to promote certain policies or products to potential borrowers, including reminders related to the potential purchase of a policy or product for any new key employees who were hired recently. In this aspect, the plan administration module 145 may be used to produce information provided to the borrower as a service, and it may also be used to generate promotional information and reminders.

In one embodiment, the plan administration module 145 may be configured to monitor and track loan portfolio value over time, so that if and when cash is removed, an unintentional lapse of any policy is avoided, thereby protecting the collateral. Similarly, the plan administration module 145 may be configured to track loan portfolio value and coordinate the timing of death benefit reductions, in order to ensure long-term cash accumulation, thereby protecting the collateral as well as the clients and other participating entities. The death benefit reduction may change over time, as interest rates change, in order to protect the collateral. The plan administration module 145 monitors and tracks the desired amount of the death benefit reduction on an ongoing basis, calculates or re-calculates the amount, and may be configured to notify the loan originator or other participating entity when an adjustment in the death benefit reduction is due and proper, and by how much.

System Architecture

In several of the embodiments of the invention referenced herein, a computer is referenced. The computer, for example, may be a mainframe, desktop, notebook or laptop, hand-held, or a handheld device such as a data acquisition and storage device. Turning to FIG. 9, one embodiment of a computer is illustrated that can be used to practice aspects of the present invention. In FIG. 9, a processor 2301, such as a microprocessor, is used to execute software instructions for carrying out the defined steps. The processor 2301 receives power from a power supply 2317 that may also provide power to the other components as necessary. The processor 2301 communicates using a data bus 2305 that is typically sixteen or thirty-two bits wide (e.g., in parallel). The data bus 2305 is used to convey data and program instructions, typically, between the processor 2301 and the memory. In the present embodiment, the memory may be considered to include a volatile primary memory 2302 such as RAM or another form of memory which retains the contents only during operation, or it may be non-volatile 2303, such as ROM, EPROM, EEPROM, FLASH, or other types of memory that retain the memory contents at all times. The memory could also be secondary memory 2304, such as disk storage, that stores large amount of data. In some embodiments, the disk storage may communicate with the processor using an I/O bus 2306 instead or a dedicated bus (not shown). The secondary memory may be a floppy disk, hard disk, compact disk, DVD, or any other type of mass storage type known to those skilled in the computer arts.

The processor 2301 also communicates with various peripherals or external devices using an I/O bus 2306. In the present embodiment, a peripheral I/O controller 2307 is used to provide standard interfaces, such as RS-232, RS-422, DIN, USB, IDE, SCSI, SATA, FireWire, Bluetooth, or other interfaces as appropriate to interface various input/output devices. Typical input/output devices include local printers 2318, a monitor 2308, a keyboard 2309, and a mouse 2310 or other pointing devices (e.g., rollerball, trackpad, joystick, and the like).

The processor 2301 typically also communicates using a communications I/O controller 2311 with external communication networks, and may use a variety of interfaces 2312 such as data communication oriented protocols such as X.25, ISDN, T-1, T-3, OC-3, OC-12, satellite, DSL, cable modems, and the like. The communications controller 2311 may also incorporate a modem (not shown) for interfacing and communicating with a standard telephone line 2313. Finally, the communications I/O controller may incorporate an Ethernet interface 2314 for communicating over a LAN. Any of these interfaces may be used to access the Internet, intranets, LANs, or other data communication facilities.

Finally, the processor 2301 may communicate with one or more wireless interfaces 2316 operatively connected to one or more antennae 2315 for communicating wirelessly with another devices, using for example, one of the IEEE 802.11 protocols, the 802.15.4 protocol, the 802.17 protocol, or any of the standard 3G wireless telecommunications protocols, such as CDMA2000 1x EV-DO, GPRS, GMPRS, W-CDMA, or any other suitable protocol.

An alternative embodiment of a processing system that may be used is shown in FIG. 5. In this embodiment, a distributed communication and processing architecture is shown involving a server 2320 communicating with either a local client computer 2326a or a remote client computer 2326b. The server 2320 typically comprises a processor 2321 that communicates with a data storage system including a database 2322, through the utilization of a secondary memory, as well as primary memory 2324. The processor also communicates with external devices using an I/O controller 2323 that typically interfaces with a LAN 2325. The LAN may provide local connectivity to one or more networked printers 2328 and one or more local client computers 2326a. The networked printers 2328 may be located in the same facility as the server, though not necessarily in the same room. Communication with remote devices typically is accomplished by routing data from the LAN 2325 over a communications facility to the Internet 2327. A remote client computer 2326b may be used to establish remote connectivity to a server 2320 over a Wide Area Network (WAN), a remote desktop session, or a Virtual Private Network (VPN) so the remote client 2326b may interact with the server, as required, by data transmitted through the Internet 2327, over the LAN 2325 or WAN or VPN, to the server 2320.

Those skilled in the art of data networking will realize that many other alternatives and architectures are possible and can be used to practice the principles of the present invention. The embodiments illustrated in FIG. 9 and FIG. 10 can be modified in different ways and be within the scope of the present invention as claimed.

Figure 10:
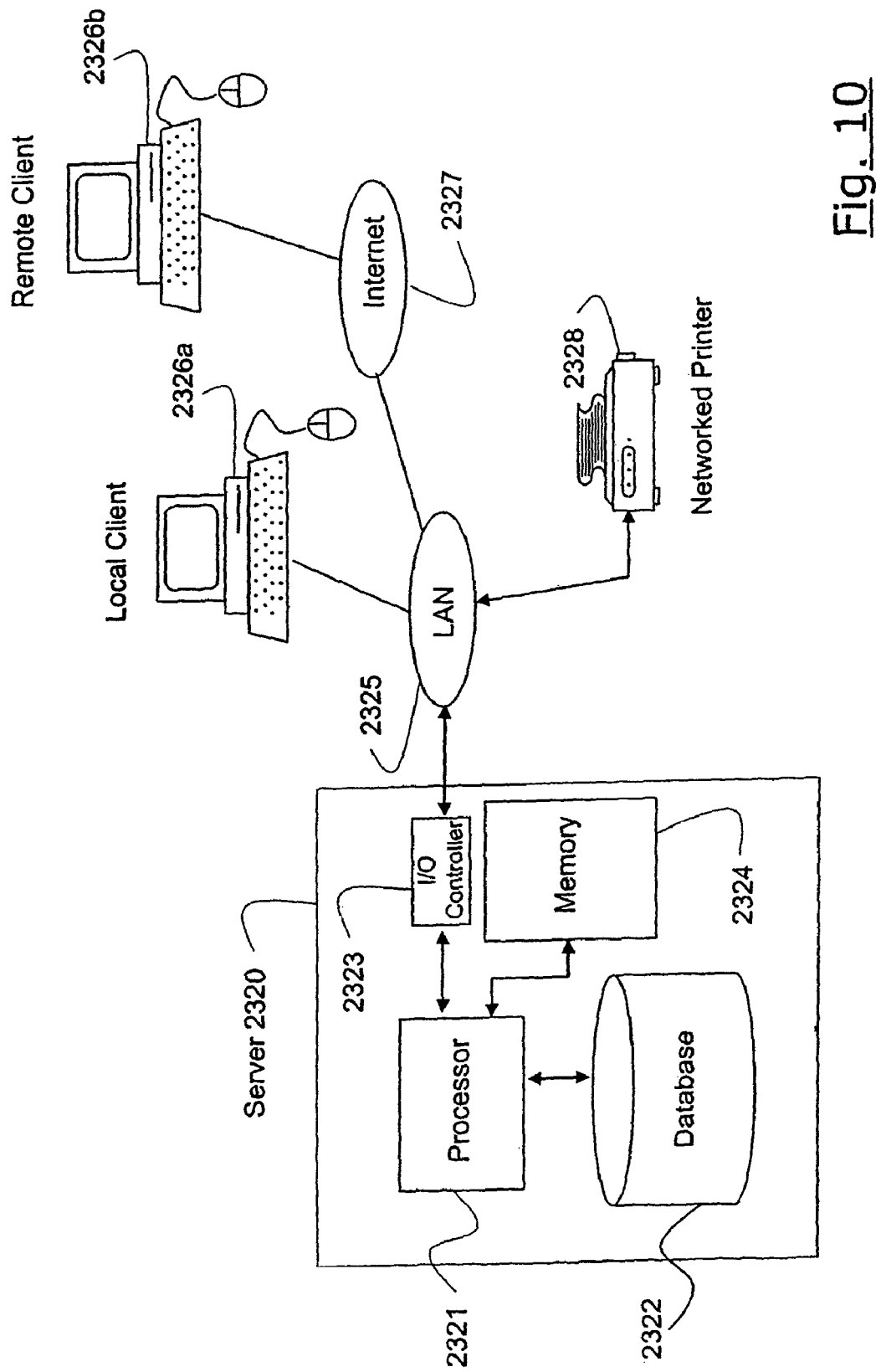
FIG. 10 is an illustration of a distributed server-client network, according to one embodiment of the present invention.

In one embodiment, as illustrated in FIG. 10, the architecture may include one or more servers 2320, one or more computer networks, and one or more local or remote clients 2326a, 2326b distributed in a multi-tiered client-server relationship. The one or more computer networks may include a variety of types of computer networks such as the internet 2327, a private intranet, a private extranet, a public switch telephone network (PSTN), a wide area network (WAN), a local area network (LAN) 2325, or any other type of network known in the art. The network, such as the LAN 2325, facilitates communications between the server 2320 and the one or more local clients 2326a. The LAN 2325 and the internet 2327 facilitate communications between the server 2320 and the one or more remote clients 2326b. Communication between two or more computer components may including, for example, a network transfer, a file transfer, an applet transfer, an Open Database Connectivity (ODBC) connection, a document mail merge, an e-mail, a Hyper-Text Transfer Protocol (HTTP) message, an XML message, a datagram, an object transfer, a binary large object (BLOB) transfer, and so on. The present invention, in one embodiment, uses the internet 2327 and its highly-efficient transmission protocols to send short, quick, efficient messages and data between and among the various computing components. In this aspect, the present invention is optimized for efficient communications and data transfer.

CONCLUSION

The described embodiments of the invention are intended to be merely exemplary. Of course, it is not possible to describe every conceivable combination of components or methodologies for purposes of describing the systems, methods, and apparatuses for accomplishing the various objectives of the invention. One of ordinary skill in the art may recognize that further combinations and permutations are possible. Accordingly, this application is intended to embrace alterations, modifications, and variations that fall within the scope of the appended claims and their equivalents.

The invention claimed is:

1. A computer system for facilitating acquisition of a credit facility for a plurality of loans provided by a loan originator to one or more borrowers, the system comprising:

one or more data tables stored in a computer-readable storage medium and including data associated with one or more products comprising one or more financial instruments that employ or accomplish a form of risk transfer and have a portion or component having a potential to grow in value over time, wherein said data in said one or more data tables include a current gap value associated with each of said one or more products, said current gap value representing the difference between a premium paid and a value of each of said one or more products; and a processor configured to execute:

a gap enhancement module configured to receive commitments associated with one or more gap enhancement instruments executed by one or more parties other than the one or more borrowers and addressing said current gap value; and a finance module configured to:

(a) combine into a portfolio said plurality of loans, each secured by one or more of said products;

(b) calculate an aggregate risk value for said portfolio, said aggregate risk value based on said current gap value of each of said one or more products in said portfolio; and (c) provide to a credit provider:
  (i) said aggregate risk value; and
  (ii) enhancement data representative of said one or more executed gap enhancement instruments and supportive of said credit facility for said portfolio of loans, having terms favorably responsive to the presence of said enhancement data.

2. The computer system of claim 1, wherein said one or more gap enhancement instruments comprise:
  (a) a collateral assignment of said one or more of said products, executed by one or more parties other than the one or more borrowers in favor of said one or more borrowers;
  (b) a compensation agreement between an employee of said one or more borrowers and said one or more borrowers;
  (c) an agreement to postpone payment of a portion of a commission earned on a sale of one or more of said products;
  (d) a rider on one or more of said products waiving a portion of a surrender fee in favor of said loan originator, said surrender fee representing an amount charged in the event said one or more of said products is surrendered or one or more of said borrowers default on one or more of said loans;
  (e) an agreement to deposit funds in a reserve account, said funds representing a portion of a surrender fee, said surrender fee representing an amount charged in the event one or more of said products is surrendered or one or more of said borrowers default on one or more of said loans;
  (f) an agreement by one or more parties other than the one or more borrowers, in the event of a surrender or default event, to extend a gap loan to said loan originator in an amount approximately equal to said current gap value, wherein a repayment obligation of said loan originator to said one or more parties other than the one or more borrowers is ultimately secured by a pledged asset; or
  (g) an agreement by one or more parties other than the one or more borrowers to pay a marketing allowance to said loan originator, said marketing allowance including a portion of costs associated with marketing one or more of said products.

3. The computer system of claim 2, wherein said gap enhancement module is further configured to:
  (a) retrieve from said one or more data tables a current amount at risk for each of said one or more products, said current amount at risk including a premium paid;
  (b) identify whether any of said one or more gap enhancement instruments already provide security for said plurality of loans; and
  (c) retrieve from said one or more data tables said value of each of said one or more products, said value representing a current value of each of said one or more products, said current value based at least in part on
    (i) a current net cash value of said product,
    (ii) a current accumulated value of said product, and
    (iii) a current collateral value of any of said identified one or more gap enhancement instruments already providing security for said plurality of loans;
  (d) calculate said current gap value;
  (e) compare said current gap value to a user-defined limit;
  (f) if said current gap value exceeds said limit, identify and select one or more gap enhancement instruments from among said gap enhancement instruments; and
  (g) update said current collateral value by combining the current collateral value of said selected one or more gap enhancement instruments with said current collateral value of said one or more identified gap enhancement instruments already providing security for said loan.

4. The computer system of claim 3, wherein said gap enhancement module is further configured to:
  compare said one or more gap enhancement instruments to a set of parameters; identify a selected gap enhancement instrument from among said one or more gap enhancement instruments, said identification based upon said set of parameters; and
  generate for execution said selected gap enhancement instrument.

5. The computer system of claim 4, wherein said set of parameters comprises:
  (1) a relative value of each of said one or more gap enhancement instruments;
  (2) a net cost of executing each of said one or more gap enhancement instruments; or
  (3) an ease of obtaining each of said one or more gap enhancement instruments.

6. The computer system of claim 3, further comprising:
  an accounts management module in communication with said gap enhancement module and said finance module, said accounts management module being executable by said processor and configured to:
    (a) retrieve payment data including details about payments received for said plurality of loans;
    (b) maintain a list of instructions in one or more of said data tables, said list of instructions based on one or more contractual agreements established between and among entities related to said portfolio of loans;
    (c) authorize distribution of funds, based on said payment data, according to said list of instructions; and
    (d) store in one or more of said data tables an auditable record of said authorization of said distribution of funds.

7. The computer system of claim 6, wherein said accounts management module is further configured to:
  prioritize said list of instructions according to said one or more contractual agreements such that said authorization of said distribution of funds is executed according to said prioritization.

8. The computer system of claim 6, wherein said list of instructions comprises:
  amounts due to one or more of said entities;
  cash reserve amounts to be maintained in one or more reserve accounts; and
  escrow amounts to be maintained in one or more escrow accounts.

9. The computer system of claim 3, further comprising:
  a plan administration module in communication with said gap enhancement module and said finance module, said plan administration module being executable by said processor and configured to:
    calculate a loan interest paid amount on each of said plurality of loans during a period, said loan interest paid amount based on the data stored in one or more of said data tables; and
    generate a report related to each of said plurality of loans, said report based at least in part on said data, said report including said calculation of loan interest paid, recommendations about accounting related to the loan under GAAP, and a number of calendar days each of said one or more products has been in-force during said period.

10. The computer system of claim 9, wherein said plan administration module is further configured to:
calculate an amount of a current death benefit reduction to be applied to one of said one or more products, said current death benefit based on data stored in one or more of said data tables, said data including a current interest rate, a forecasted product yield, a hard minimum and maximum death benefit, a hard minimum and maximum death benefit, tax guidelines, product requirements, surrender costs, and a past death benefit reduction already applied to said one of said one or more products;
generate a notice to entities related to said plurality of loans, said notice including the amount of said current death benefit reduction and a date upon which it should be applied; and
record the amount of said current death benefit reduction in one or more of said data tables associated with said one of said one or more products.

11. The computer system of claim 10, wherein said plan administration module is further configured to:
calculate the amount of said current death benefit reduction based at least in part on said updated current collateral value for one or more of said plurality of loans, such that said reduction provides a improved degree of protection for said selected one or more gap enhancement instruments.

12. The computer system of claim 11, wherein said selected one or more gap enhancement instruments comprises an asset of the borrower pledged as collateral for one or more of said loans.

13. The computer system of claim 3, wherein said user-defined limit comprises at least one of:
(a) a specific dollar amount;
(b) a ratio of selected values related to said one or more products; or
(c) a percentage of a premium outlay associated with said one or more products.

14. The computer system of claim 3, wherein said gap enhancement module further comprises:
a cash value tool executable by said processor and configured to calculate said current gap value; and
a compare tool executable by said processor and configured to identify and select said one or more gap enhancement instruments based upon a set of parameters.

15. The computer system of claim 14, wherein said set of parameters comprises at least one of:
(1) a relative value of each of said one or more gap enhancement instruments;
(2) a net cost of executing each of said one or more gap enhancement instruments; or
(3) an ease of obtaining each of said one or more gap enhancement instruments.

16. The computer system of claim 1, wherein said terms are more favorable than would be available for an individual loan selected from said plurality of loans.

17. The computer system of claim 1, wherein said finance module is further configured to:
calculate an aggregate yield for said portfolio, based on a yield for each loan in said portfolio; and
provide said aggregate yield to said credit provider for a purpose of obtaining and maintaining said credit facility.

18. The computer system of claim 17, wherein said finance module is further configured to:
provide said aggregate risk value, said enhancement data, and said aggregate yield to an investment bank, wherein said aggregate risk value, said enhancement data, and said aggregate yield are of sufficient quality to support an issuance of asset-backed security interests in said portfolio of loans, said asset-backed security interests being suitable for trading in the capital markets to multiple investors.

19. The computer system of claim 18, further comprising:
a trading module executable by said processor and in communication with said gap enhancement module and said finance module, said trading module configured to manage one or more trading transactions involving said asset-backed security interests.

20. The computer system of claim 1, wherein said finance module is further configured to:
provide said aggregate risk value and said enhancement data to a loan purchaser, wherein said aggregate risk value and said enhancement data are of sufficient quality to permit said loan purchaser to issue a variable funding note to finance a purchase of said portfolio of loans by said loan purchaser; and
coordinate said purchase of said variable funding note by a VFN purchaser.

21. The computer system of claim 1, wherein said finance module is further configured to:
establish a bankruptcy-remote special purpose entity, wherein said aggregate risk value and said enhancement data are of sufficient quality to permit said bankruptcy-remote special purpose entity to receive said portfolio of loans in a true sale transaction sufficient to enhance a creditworthiness of said portfolio of loans.

22. The computer system of claim 1, wherein said finance module is further configured to:
provide said aggregate risk value and said enhancement data to an investment bank, wherein said aggregate risk value and said enhancement data are of sufficient quality to permit an issuance of asset-backed security interests in said portfolio of loans, said asset-backed security interests suitable for trading in the capital markets to multiple investors.

23. The computer system of claim 1, said computer system further comprising:
a network; and
a communications controller capable of transmitting said aggregate risk value over said network.

24. A computer program product, comprising a computer-readable storage medium having an executable program code stored thereon, wherein said program code instructs a processor to perform steps for facilitating acquisition of a credit facility for a plurality of loans provided by a loan originator to one or more borrowers, said steps comprising:
A) accessing one or more data tables and distinct software modules, wherein said data tables are located on a data storage system and include data associated with one or more products comprising one or more financial instruments that employ or accomplish a form of risk transfer and have a portion or component having a potential to grow in value over time, and wherein said distinct software modules comprise a finance module, a gap enhancement module, and a computer program module;
B) combining into a portfolio said plurality of loans secured by one or more of said products, wherein said combining is performed by said finance module in response to being called by said computer program module;
C) calculating an aggregate risk value for said portfolio, said aggregate risk value based on a current gap value stored in said one or more data tables, said current gap value representing the difference between a premium paid and a value of each of said one or more products, wherein said calculating is performed by said finance module in response to being called by said computer program module;

D) receiving commitments associated with one or more gap enhancement instruments executed by one or more parties other than the one or more borrowers and addressing said current gap value, wherein said receiving is performed by said gap enhancement module in response to being called by said computer program module; and E) providing to a credit provider:
  (i) said aggregate risk value; and
  (ii) enhancement data representative of said one or more executed gap enhancement instruments and supportive of said credit facility for said portfolio of loans, having terms favorably responsive to the presence of said enhancement data; and
  wherein said providing is performed by said finance and gap enhancement modules in response to being called by said computer program module.

25. A computer system for facilitating acquisition of a credit facility for a plurality of loans provided by a loan originator to one or more borrowers, said system comprising:
  A) means for combining into a portfolio said plurality of loans secured by one or more products comprising one or more financial instruments that employ or accomplish a form of risk transfer and have a portion or component having a potential to grow in value over time;
  B) means for calculating an aggregate risk value for said portfolio, said aggregate risk value based on a current gap value, said current gap value representing the difference between a premium paid and a value of each of said one or more products;
  C) means for receiving commitments associated with one or more gap enhancement instruments executed by one or more parties other than the borrowers and addressing said current gap value; and
  D) means for providing to a credit provider:
    (i) said aggregate risk value; and
    (ii) enhancement data representative of said one or more gap enhancement instruments and supportive of said credit facility for said portfolio of loans, having terms favorably responsive to the presence of said enhancement data.

26. A computer system for facilitating acquisition of a credit facility for a plurality of loans provided by a loan originator to one or more borrowers, said system comprising:
  one or more data tables including data associated with one or more insurance products purchased by said one or more borrowers using proceeds of one or more of said plurality of loans, said one or more insurance products naming one or more employees of said one or more borrowers as an insured, wherein said data in said one or more data tables include a current gap value associated with each of said one or more insurance products, said current gap value representing the difference between a premium paid and a value of each of said one or more insurance products; and
  a processor configured to execute:
    a gap enhancement module configured to:
      (a) retrieve from said one or more data tables a current amount at risk for each of said one or more insurance products, said current amount at risk including said premium paid;
      (b) identify whether one or more gap enhancement instruments executed by one or more parties other than the one or more borrowers and addressing said current gap value already provide security for said plurality of loans;
      (c) retrieve from said one or more data tables said value of each of said one or more insurance products, said value representing a current value of each of said one or more insurance products, said current value based at least in part on
        (i) a current net cash value of each of said one or more insurance products,
        (ii) a current accumulated value of each of said one or more insurance products, and
        (iii) a current collateral value of any of said identified one or more gap enhancement instruments already providing security for said plurality of loans;
      (d) calculate said current gap value;
      (e) compare said current gap value to a user-defined limit for each of said one or more insurance products;
      (f) if said current gap value exceeds said user-defined limit for a deficient one of said one or more insurance products, identify and select one or more gap enhancement instruments from among said one or more gap enhancement instruments, said selected one or more gap enhancement instruments comprising:
        (i) a rider on said deficient one of said insurance products waiving a portion of a surrender fee in favor of said loan originator, said surrender fee representing an amount charged in the event said deficient one of said insurance products is surrendered or one or more of said borrowers defaults on one or more of said loans;
        (ii) an agreement to deposit funds in a reserve account, said funds representing a portion of a surrender fee, said surrender fee representing an amount charged in the event said deficient one or more of said insurance products is surrendered or one or more of said borrowers defaults on one or more of said loans; or
        (iii) an agreement by one or more parties other than said one or more borrowers, in the event of a surrender or default event, to extend a gap loan to said loan originator in an amount approximately equal to said current gap value, wherein said loan originator's obligation to repay said gap loan is secured by a pledged asset; and
      (g) receive commitments associated with said selected one or more gap enhancement instruments for said deficient one of said one or more insurance products; and a finance module configured to:
        (i) combine into a portfolio said plurality of loans each secured by one or more of said insurance products;
        (ii) calculate an aggregate risk value for said portfolio of loans, said aggregate risk value based on said current gap value of each of said one or more insurance products in said portfolio;
        (iii) receive enhancement data representative of execution of said selected one or more gap enhancement instruments by one or more parties other than said one or more borrowers;
        (iv) provide to a credit provider said aggregate risk value and said enhancement data; and
        (v) provide to an investment bank said aggregate risk value and said enhancement data, wherein said aggregate risk value and said enhancement data are of sufficient quality to permit an issuance of asset-backed security interests in said portfolio of loans, and wherein said asset-backed security interests are suitable for trading in the capital markets to multiple investors.

27. The computer system of claim 26, said computer system further comprising:
 a network; and
 a communications controller capable of transmitting said aggregate risk value and said enhancement data over said network.

28. The computer system of claim 26, wherein said finance module is further configured to establish a bankruptcy-remote special purpose entity, wherein said aggregate risk value and said enhancement data are of sufficient quality to permit said bankruptcy-remote special purpose entity to receive said portfolio of loans in a true sale transaction sufficient to enhance a creditworthiness of said portfolio of loans.

29. The computer system of claim 26, wherein said user-defined limit comprises at least one of:
 (a) a specific dollar amount;
 (b) a ratio of selected values related to said one or more products; or
 (c) a percentage of a premium outlay associated with said one or more products.

30. The computer system of claim 26, wherein said gap enhancement module is further configured to:
 compare said one or more gap enhancement instruments to a set of parameters;
 identify a selected one or more gap enhancement instruments from among said one or more gap enhancement instruments, said identification based upon said set of parameters; and
 generate for execution said selected one or more gap enhancement instruments.

31. The computer system of claim 30, wherein said set of parameters comprises at least one of:
 (1) a relative value of each of said one or more gap enhancement instruments;
 (2) a net cost of executing each of said one or more gap enhancement instruments; or
 (3) an ease of obtaining each of said one or more gap enhancement instruments.

32. The computer system of claim 26, wherein said agreement to extend said gap loan comprises an agreement by an insurance carrier that has written one of said insurance products on an employee of one of said borrowers; and wherein said pledged asset securing repayment of said gap loan comprises accounts receivable of said employing borrower.

33. A computer program product comprising a computer-readable storage medium having an executable program code stored thereon, wherein said program code instructs a processor to perform steps for facilitating acquisition of a credit facility for a plurality of loans provided by a loan originator to one or more borrowers, said steps comprising:
 A) accessing one or more data tables, wherein said data tables are located on a data storage system and include data associated with one or more products comprising one or more financial instruments that employ or accomplish a form of risk transfer and have a portion or component having a potential to grow in value over time;
 B) combining into a portfolio said plurality of loans secured by one or more of said products;
 C) calculating an aggregate risk value for said portfolio, said aggregate risk value based on a current gap value stored in said one or more data tables, said current gap value representing the difference between a premium paid and a value of each of said one or more products;
 D) receiving commitments associated with one or more gap enhancement instruments executed by one or more parties other than the borrowers and addressing said current gap value; and
 E) providing to a credit provider:
  (i) said aggregate risk value; and
  (ii) enhancement data representative of said one or more executed gap enhancement instruments and supportive of said credit facility for said portfolio of loans, having terms favorably responsive to the presence of said enhancement data.

* * * * *